US011769272B2

(12) United States Patent
Serafin

(10) Patent No.: US 11,769,272 B2
(45) Date of Patent: Sep. 26, 2023

(54) DISTINGUISHING, IN A POINT CLOUD DATA SET REPRESENTED BY AN IMAGE, A FIRST OBJECT FROM A SECOND OBJECT

(71) Applicant: Toyota Research Institute, Inc., Los Altos, CA (US)

(72) Inventor: Jacopo Serafin, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 560 days.

(21) Appl. No.: 16/943,371

(22) Filed: Jul. 30, 2020

(65) Prior Publication Data

US 2022/0036580 A1 Feb. 3, 2022

(51) Int. Cl.
*G06T 7/73* (2017.01)
*G06V 10/26* (2022.01)

(52) U.S. Cl.
CPC ............... *G06T 7/73* (2017.01); *G06V 10/26* (2022.01); *G06T 2207/10024* (2013.01); *G06T 2207/10028* (2013.01); *G06T 2207/20072* (2013.01); *G06T 2207/20076* (2013.01); *G06T 2207/30224* (2013.01)

(58) Field of Classification Search
CPC ............ G06T 7/73; G06T 2207/10024; G06T 2207/10028; G06T 2207/20072; G06T 2207/20076; G06T 2207/30224; G06T 7/162; G06T 7/11; G06V 10/26; G06V 10/765; G06V 10/82; G06V 20/64
See application file for complete search history.

(56) References Cited

U.S. PATENT DOCUMENTS

| 10,120,068 | B1 | 11/2018 | Wu et al. |
| 2019/0235083 | A1 | 8/2019 | Zhang et al. |
| 2019/0313085 | A1 | 10/2019 | Trevor et al. |
| 2019/0318498 | A1 * | 10/2019 | Yoshikawa ............ G06V 20/56 |
| 2020/0003869 | A1 | 1/2020 | Yang et al. |

FOREIGN PATENT DOCUMENTS

CN 110274588 A 9/2019

OTHER PUBLICATIONS

Berger et al., "A Survey of Surface Reconstruction from Point Clouds," Computer Graphics Forum, 2016, pp. 1-27, vol. 0, No. 0.

(Continued)

*Primary Examiner* — Mekonen T Bekele
(74) *Attorney, Agent, or Firm* — Christopher G. Darrow; Darrow Mustafa PC

(57) ABSTRACT

In a point cloud data set represented by an image, a first object can be caused to be distinguished from a second object. Current positions of points in the point cloud data set can be arguments for functions of a set of functions. The set of functions can include attraction functions for the points and repulsion functions for the points. Results of the set of functions can be calculated. Based on the results, at least some of the points can be caused to move from the current positions to new positions. In the point cloud data set represented by the image with the at least some of the points being at the new positions, the first object can be distinguished from the second object.

20 Claims, 18 Drawing Sheets

(56) References Cited

OTHER PUBLICATIONS

Ozdemir et al., "Delineating Bone Surfaces in B-Mode Images Constrained by Physics of Ultrasound Propagation," Jan. 7, 2020, pp. 1-11 found at https://arxiv.org/abs/2001.02001.

Rosinol et al., "Incremental Visual-Inertial 3D Mesh Generation with Structural Regularities," IEEE Int. Conf. Robot. Autom. (ICRA), Jul. 29, 2019, pp. 1-7.

Drost et al., "Image Segmentation Using Factor Graphs," IEEE Workshop on Statistical Signal Processing, St. Louis, MO, 2003, pp. 150-153.

Yu et al., "Segmentation with Pairwise Attraction and Repulsion," Proceedings Eight IEEE International Conference on Computer Vision, 2001, pp. 1-7, vol. 1.

Shihao Wu et al., "Geometric Structure Extraction and Reconstruction," 2018, pp. 1-182, found at https://boristheses.unibe.ch/id/eprint/796.

Joan Navarro, "Information Metrics for Localization and Mapping," Feb. 27, 2019, pp. 1-140, found at http://hdl.handle.net/10803/668937.

Conor McDonald, "Machine learning fundamentals (i): Cost functions and gradient descent," Nov. 27, 2017, pp. 1-11, found at https://towardsdatascience.com/machine-learning-fundamentals-via-linear-regression-41a5d11f5220.

Stein et al., "Learning to Find Object Boundaries Using Motion Cues," IEEE 11th International Conference on Computer Vision, Rio de Janeiro, 2007, pp. 1-8.

Rosique et al., "A Systematic Review of Perception System and Simulators for Autonomous Vehicles Research," Sensors, vol. 19, issue 3, Feb. 2019, pp. 1-29.

Steve Taranovich, "Autonomous automotive sensors: How processor algorithms get their inputs," Jul. 2016, pp. 1-20, found at https://www.edn.com/autonomous-automotive-sensors-how-processor-algorithms-get-their-inputs/.

Unknown, "Lidar," https://en.wikipedia.org/wiki/Lidar (Last accessed Jul. 20, 2020, 17 pages).

Unknown, "point cloud," https://en.wikipedia.org/wiki/Point_cloud (Last accessed Jun. 7, 2020, 2 pages).

Unknown, "factor graph," https://en.wikipedia.org/wiki/Factor_graph (Last accessed May 11, 2019, 4 pages).

Xu et al., "Voxel-and Graph-Based Point Cloud Segmentation of 3D Scenes Using Perceptual Grouping Laws," ISPRS Annals of Photogrammetry, Remote Sensing & Spatial Information Sciences, 2017, pp. 43-50, vol. 4, Issue 1.

Landrieu et al., "Point Cloud Oversegmentation with Graph-Structured Deep Metric Learning," Proceedings of the IEEE/CVF Conference on Computer Vision and Pattern Recognition (CVPR), Apr. 3, 2019, pp. 7440-7449.

Golovinskiy et al., "Min-Cut Based Segmentation of Point Clouds," 2009 IEEE 12th International Conference on Computer Vision Workshops, ICCV Workshops, pp. 1-8.

Ben-Shabat et al., "Graph Based Over-Segmentation Methods for 3D Point Clouds," Feb. 14, 2017, pp. 1-15, found at https://arxiv.org/pdf/1702.04114.pdf.

Strom et al., "Graph-based Segmentation for Colored 3D Laser Point Clouds," 2010 IEEE/RSJ International Conference on Intelligent Robots and Systems, Taipei, 2010, pp. 2131-2136.

Burger et al., "Fast Multi-Pass 3D Point Segmentation Based on a Structured Mesh Graph for Ground Vehicles," 2018 IEEE Intelligent Vehicles Symposium (IV) Changshu, Suzhou, China, Jun. 2018, pp. 1-7.

\* cited by examiner

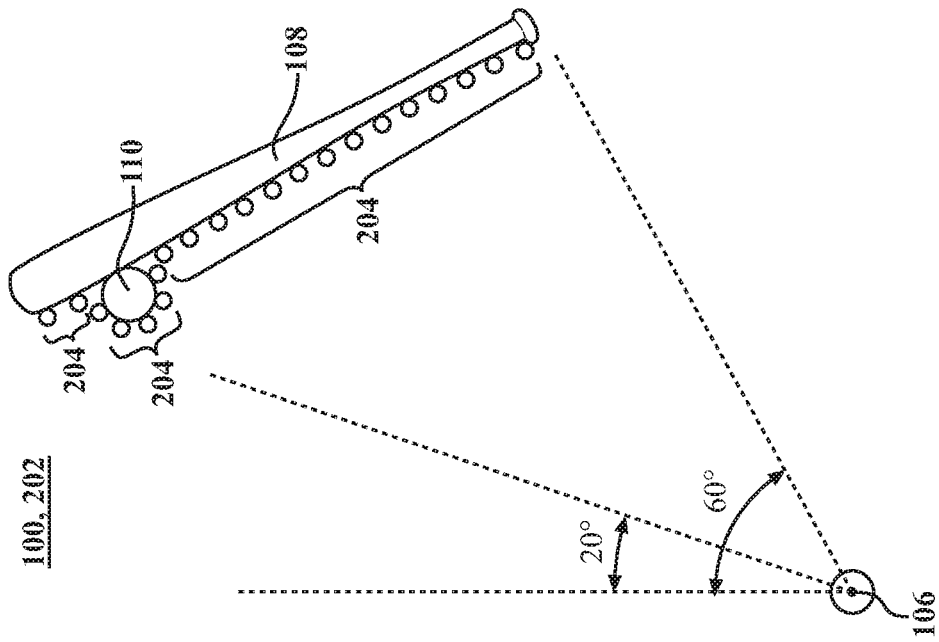
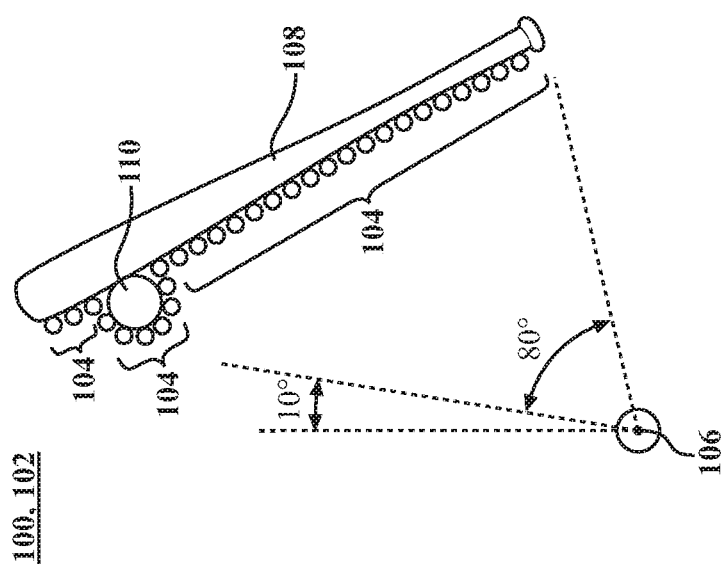

204

| | Point #1 | | Point #2 | | Point #3 | | Point #4 | | Point #5 | |
|---|---|---|---|---|---|---|---|---|---|---|
| ρ | 58.8 | ρ | 66.0 | ρ | 65.2 | ρ | 64.4 | ρ | 57.6 |
| φ | 28° | φ | 20° | φ | 22° | φ | 24° | φ | 26° |
| z | 58 | z | 56 | z | 56 | z | 56 | z | 56 |
| R | 255 | R | 204 | R | 204 | R | 204 | R | 255 |
| G | 255 | G | 153 | G | 153 | G | 153 | G | 255 |
| B | 255 | B | 0 | B | 0 | B | 0 | B | 255 |
| α | 0 | α | 0 | α | 0 | α | 0 | α | 0 |
| class | batting | class | batting | class | batting | class | batting | class | batting |

502 denotes rows ρ, φ, z; 504 denotes R, G, B; 506 denotes α; 508 denotes class.

| | Point #6 | | Point #7 | | Point #8 | | Point #9 | | Point #10 | |
|---|---|---|---|---|---|---|---|---|---|---|
| ρ | 56.8 | ρ | 56.0 | ρ | 61.2 | ρ | 60.4 | ρ | 59.6 |
| φ | 28° | φ | 30° | φ | 32° | φ | 34° | φ | 36° |
| z | 56 | z | 56 | z | 56 | z | 56 | z | 56 |
| R | 255 | R | 255 | R | 204 | R | 204 | R | 204 |
| G | 255 | G | 255 | G | 153 | G | 153 | G | 153 |
| B | 255 | B | 255 | B | 0 | B | 0 | B | 0 |
| α | 0 | α | 0 | α | 0 | α | 0 | α | 0 |
| class | batting | class | batting | class | batting | class | batting | class | batting |

| | Point #11 | | Point #12 | | Point #13 | | Point #14 | | Point #15 | |
|---|---|---|---|---|---|---|---|---|---|---|
| ρ | 58.8 | ρ | 58.0 | ρ | 57.2 | ρ | 56.4 | ρ | 55.6 |
| φ | 38° | φ | 40° | φ | 42° | φ | 44° | φ | 46° |
| z | 56 | z | 56 | z | 56 | z | 56 | z | 56 |
| R | 204 | R | 204 | R | 204 | R | 204 | R | 204 |
| G | 153 | G | 153 | G | 153 | G | 153 | G | 153 |
| B | 0 | B | 0 | B | 0 | B | 0 | B | 0 |
| α | 0 | α | 0 | α | 0 | α | 0 | α | 0 |
| class | batting | class | batting | class | batting | class | batting | class | batting |

| | Point #16 | | Point #17 | | Point #18 | | Point #19 | | Point #20 | |
|---|---|---|---|---|---|---|---|---|---|---|
| ρ | 54.8 | ρ | 66.0 | ρ | 65.2 | ρ | 60.4 | ρ | 57.6 |
| φ | 48° | φ | 20° | φ | 22° | φ | 24° | φ | 26° |
| z | 56 | z | 54 | z | 54 | z | 54 | z | 54 |
| R | 204 | R | 204 | R | 204 | R | 255 | R | 255 |
| G | 153 | G | 153 | G | 153 | G | 255 | G | 255 |
| B | 0 | B | 0 | B | 0 | B | 255 | B | 255 |
| α | 0 | α | 0 | α | 0 | α | 0 | α | 0 |
| class | batting | class | batting | class | batting | class | batting | class | batting |

| Point #21 | |
|---|---|
| ρ | 54.8 |
| φ | 28° |
| z | 54 |
| R | 255 |
| G | 255 |
| B | 255 |
| α | 0 |
| class | batting |

| Point #22 | |
|---|---|
| ρ | 56.0 |
| φ | 30° |
| z | 54 |
| R | 255 |
| G | 255 |
| B | 255 |
| α | 0 |
| class | batting |

| Point #23 | |
|---|---|
| ρ | 57.2 |
| φ | 32° |
| z | 54 |
| R | 255 |
| G | 255 |
| B | 255 |
| α | 0 |
| class | batting |

| Point #24 | |
|---|---|
| ρ | 60.4 |
| φ | 34° |
| z | 54 |
| R | 204 |
| G | 153 |
| B | 0 |
| α | 0 |
| class | batting |

| Point #25 | |
|---|---|
| ρ | 59.6 |
| φ | 36° |
| z | 54 |
| R | 204 |
| G | 153 |
| B | 0 |
| α | 0 |
| class | batting |

| Point #26 | |
|---|---|
| ρ | 58.8 |
| φ | 38° |
| z | 54 |
| R | 204 |
| G | 153 |
| B | 0 |
| α | 0 |
| class | batting |

| Point #27 | |
|---|---|
| ρ | 58.0 |
| φ | 40° |
| z | 54 |
| R | 204 |
| G | 153 |
| B | 0 |
| α | 0 |
| class | batting |

| Point #28 | |
|---|---|
| ρ | 57.2 |
| φ | 42° |
| z | 54 |
| R | 204 |
| G | 153 |
| B | 0 |
| α | 0 |
| class | batting |

| Point #29 | |
|---|---|
| ρ | 56.4 |
| φ | 44° |
| z | 54 |
| R | 204 |
| G | 153 |
| B | 0 |
| α | 0 |
| class | batting |

| Point #30 | |
|---|---|
| ρ | 55.6 |
| φ | 46° |
| z | 54 |
| R | 204 |
| G | 153 |
| B | 0 |
| α | 0 |
| class | batting |

| Point #31 | |
|---|---|
| ρ | 54.8 |
| φ | 48° |
| z | 54 |
| R | 204 |
| G | 153 |
| B | 0 |
| α | 0 |
| class | batting |

| Point #32 | |
|---|---|
| ρ | 54.0 |
| φ | 50° |
| z | 54 |
| R | 204 |
| G | 153 |
| B | 0 |
| α | 0 |
| class | batting |

| Point #33 | |
|---|---|
| ρ | 53.2 |
| φ | 52° |
| z | 54 |
| R | 204 |
| G | 153 |
| B | 0 |
| α | 0 |
| class | batting |

| Point #34 | |
|---|---|
| ρ | 52.4 |
| φ | 54° |
| z | 54 |
| R | 204 |
| G | 153 |
| B | 0 |
| α | 0 |
| class | batting |

| Point #35 | |
|---|---|
| ρ | 51.6 |
| φ | 56° |
| z | 54 |
| R | 204 |
| G | 153 |
| B | 0 |
| α | 0 |
| class | batting |

| Point #36 | |
|---|---|
| ρ | 50.8 |
| φ | 58° |
| z | 54 |
| R | 204 |
| G | 153 |
| B | 0 |
| α | 0 |
| class | batting |

| Point #37 | |
|---|---|
| ρ | 50.0 |
| φ | 60° |
| z | 54 |
| R | 204 |
| G | 153 |
| B | 0 |
| α | 0 |
| class | batting |

| Point #38 | |
|---|---|
| ρ | 66.0 |
| φ | 20° |
| z | 52 |
| R | 204 |
| G | 153 |
| B | 0 |
| α | 0 |
| class | batting |

| Point #39 | |
|---|---|
| ρ | 65.2 |
| φ | 22° |
| z | 52 |
| R | 204 |
| G | 153 |
| B | 0 |
| α | 0 |
| class | batting |

| Point #40 | |
|---|---|
| ρ | 64.4 |
| φ | 24° |
| z | 52 |
| R | 204 |
| G | 153 |
| B | 0 |
| α | 0 |
| class | batting |

| Point #41 | |
|---|---|
| ρ | 57.6 |
| φ | 26° |
| z | 52 |
| R | 255 |
| G | 255 |
| B | 255 |
| α | 0 |
| class | batting |

| Point #42 | |
|---|---|
| ρ | 56.8 |
| φ | 28° |
| z | 52 |
| R | 255 |
| G | 255 |
| B | 255 |
| α | 0 |
| class | batting |

| Point #43 | |
|---|---|
| ρ | 56.0 |
| φ | 30° |
| z | 52 |
| R | 255 |
| G | 255 |
| B | 255 |
| α | 0 |
| class | batting |

| Point #44 | |
|---|---|
| ρ | 61.2 |
| φ | 32° |
| z | 52 |
| R | 204 |
| G | 153 |
| B | 0 |
| α | 0 |
| class | batting |

| Point #45 | |
|---|---|
| ρ | 60.4 |
| φ | 34° |
| z | 52 |
| R | 204 |
| G | 153 |
| B | 0 |
| α | 0 |
| class | batting |

| Point #46 | |
|---|---|
| ρ | 59.6 |
| φ | 36° |
| z | 52 |
| R | 204 |
| G | 153 |
| B | 0 |
| α | 0 |
| class | batting |

| Point #47 | |
|---|---|
| ρ | 58.8 |
| φ | 38° |
| z | 52 |
| R | 204 |
| G | 153 |
| B | 0 |
| α | 0 |
| class | batting |

| Point #48 | |
|---|---|
| ρ | 58.0 |
| φ | 40° |
| z | 52 |
| R | 204 |
| G | 153 |
| B | 0 |
| α | 0 |
| class | batting |

| Point #49 | |
|---|---|
| ρ | 57.2 |
| φ | 42° |
| z | 52 |
| R | 204 |
| G | 153 |
| B | 0 |
| α | 0 |
| class | batting |

| Point #50 | |
|---|---|
| ρ | 56.4 |
| φ | 44° |
| z | 52 |
| R | 204 |
| G | 153 |
| B | 0 |
| α | 0 |
| class | batting |

| Point #51 | |
|---|---|
| ρ | 55.6 |
| φ | 46° |
| z | 52 |
| R | 204 |
| G | 153 |
| B | 0 |
| α | 0 |
| class | batting |

| Point #52 | |
|---|---|
| ρ | 54.8 |
| φ | 48° |
| z | 52 |
| R | 204 |
| G | 153 |
| B | 0 |
| α | 0 |
| class | batting |

| Point #53 | |
|---|---|
| ρ | 58.8 |
| φ | 28° |
| z | 50 |
| R | 255 |
| G | 255 |
| B | 255 |
| α | 0 |
| class | batting |

| Point #1 | |
|---|---|
| ρ | 58.8 |
| φ | 28° |
| z | 56.6 |
| R | 255 |
| G | 255 |
| B | 255 |
| α | 0 |
| class | batting |

| Point #2 | |
|---|---|
| ρ | 65.7 |
| φ | 20.7° |
| z | 55.3 |
| R | 204 |
| G | 153 |
| B | 0 |
| α | 0 |
| class | batting |

| Point #3 | |
|---|---|
| ρ | 65.2 |
| φ | 22° |
| z | 55.3 |
| R | 204 |
| G | 153 |
| B | 0 |
| α | 0 |
| class | batting |

| Point #4 | |
|---|---|
| ρ | 64.7 |
| φ | 23.3° |
| z | 55.3 |
| R | 204 |
| G | 153 |
| B | 0 |
| α | 0 |
| class | batting |

| Point #5 | |
|---|---|
| ρ | 57.3 |
| φ | 26.7° |
| z | 55.3 |
| R | 255 |
| G | 255 |
| B | 255 |
| α | 0 |
| class | batting |

| Point #6 | |
|---|---|
| ρ | 56.8 |
| φ | 28° |
| z | 55.3 |
| R | 255 |
| G | 255 |
| B | 255 |
| α | 0 |
| class | batting |

| Point #7 | |
|---|---|
| ρ | 56.3 |
| φ | 29.3° |
| z | 55.3 |
| R | 255 |
| G | 255 |
| B | 255 |
| α | 0 |
| class | batting |

| Point #8 | |
|---|---|
| ρ | 59.1 |
| φ | 36.9° |
| z | 55.3 |
| R | 204 |
| G | 153 |
| B | 0 |
| α | 0 |
| class | batting |

| Point #9 | |
|---|---|
| ρ | 58.6 |
| φ | 38.2° |
| z | 55.3 |
| R | 204 |
| G | 153 |
| B | 0 |
| α | 0 |
| class | batting |

| Point #10 | |
|---|---|
| ρ | 58.1 |
| φ | 39.5° |
| z | 55.3 |
| R | 204 |
| G | 153 |
| B | 0 |
| α | 0 |
| class | batting |

| Point #11 | |
|---|---|
| ρ | 57.6 |
| φ | 40.8° |
| z | 55.3 |
| R | 204 |
| G | 153 |
| B | 0 |
| α | 0 |
| class | batting |

| Point #12 | |
|---|---|
| ρ | 57.1 |
| φ | 42.1° |
| z | 55.3 |
| R | 204 |
| G | 153 |
| B | 0 |
| α | 0 |
| class | batting |

| Point #13 | |
|---|---|
| ρ | 56.6 |
| φ | 43.4° |
| z | 55.3 |
| R | 204 |
| G | 153 |
| B | 0 |
| α | 0 |
| class | batting |

| Point #14 | |
|---|---|
| ρ | 56.1 |
| φ | 44.7° |
| z | 55.3 |
| R | 204 |
| G | 153 |
| B | 0 |
| α | 0 |
| class | batting |

| Point #15 | |
|---|---|
| ρ | 55.6 |
| φ | 46° |
| z | 55.3 |
| R | 204 |
| G | 153 |
| B | 0 |
| α | 0 |
| class | batting |

| Point #16 | |
|---|---|
| ρ | 55.1 |
| φ | 47.3° |
| z | 55.3 |
| R | 204 |
| G | 153 |
| B | 0 |
| α | 0 |
| class | batting |

| Point #17 | |
|---|---|
| ρ | 65.7 |
| φ | 20.7° |
| z | 54 |
| R | 204 |
| G | 153 |
| B | 0 |
| α | 0 |
| class | batting |

| Point #18 | |
|---|---|
| ρ | 65.2 |
| φ | 22° |
| z | 54 |
| R | 204 |
| G | 153 |
| B | 0 |
| α | 0 |
| class | batting |

| Point #19 | |
|---|---|
| ρ | 59.8 |
| φ | 25.4° |
| z | 54 |
| R | 255 |
| G | 255 |
| B | 255 |
| α | 0 |
| class | batting |

| Point #20 | |
|---|---|
| ρ | 57.3 |
| φ | 26.7° |
| z | 54 |
| R | 255 |
| G | 255 |
| B | 255 |
| α | 0 |
| class | batting |

| Point #21 | |
|---|---|
| ρ | 54.8 |
| φ | 28° |
| z | 54 |
| R | 255 |
| G | 255 |
| B | 255 |
| α | 0 |
| class | batting |

| Point #22 | |
|---|---|
| ρ | 56.3 |
| φ | 29.3° |
| z | 54 |
| R | 255 |
| G | 255 |
| B | 255 |
| α | 0 |
| class | batting |

| Point #23 | |
|---|---|
| ρ | 57.8 |
| φ | 30.6° |
| z | 54 |
| R | 255 |
| G | 255 |
| B | 255 |
| α | 0 |
| class | batting |

| Point #24 | |
|---|---|
| ρ | 58.6 |
| φ | 38.2° |
| z | 54 |
| R | 204 |
| G | 153 |
| B | 0 |
| α | 0 |
| class | batting |

| Point #25 | |
|---|---|
| ρ | 58.1 |
| φ | 39.5° |
| z | 54 |
| R | 204 |
| G | 153 |
| B | 0 |
| α | 0 |
| class | batting |

| Point #26 | |
|---|---|
| ρ | 57.6 |
| φ | 40.8° |
| z | 54 |
| R | 204 |
| G | 153 |
| B | 0 |
| α | 0 |
| class | batting |

| Point #27 | |
|---|---|
| ρ | 57.1 |
| φ | 42.1° |
| z | 54 |
| R | 204 |
| G | 153 |
| B | 0 |
| α | 0 |
| class | batting |

| Point #28 | |
|---|---|
| ρ | 56.6 |
| φ | 43.4° |
| z | 54 |
| R | 204 |
| G | 153 |
| B | 0 |
| α | 0 |
| class | batting |

| Point #29 | |
|---|---|
| ρ | 56.1 |
| φ | 44.7° |
| z | 54 |
| R | 204 |
| G | 153 |
| B | 0 |
| α | 0 |
| class | batting |

| Point #30 | |
|---|---|
| ρ | 55.6 |
| φ | 46° |
| z | 54 |
| R | 204 |
| G | 153 |
| B | 0 |
| α | 0 |
| class | batting |

| Point #31 | |
|---|---|
| ρ | 55.1 |
| φ | 47.3° |
| z | 54 |
| R | 204 |
| G | 153 |
| B | 0 |
| α | 0 |
| class | batting |

| Point #32 | |
|---|---|
| ρ | 54.6 |
| φ | 48.6° |
| z | 54 |
| R | 204 |
| G | 153 |
| B | 0 |
| α | 0 |
| class | batting |

| Point #33 | |
|---|---|
| ρ | 54.1 |
| φ | 49.9° |
| z | 54 |
| R | 204 |
| G | 153 |
| B | 0 |
| α | 0 |
| class | batting |

| Point #34 | |
|---|---|
| ρ | 53.6 |
| φ | 51.2° |
| z | 54 |
| R | 204 |
| G | 153 |
| B | 0 |
| α | 0 |
| class | batting |

| Point #35 | |
|---|---|
| ρ | 53.1 |
| φ | 52.5° |
| z | 54 |
| R | 204 |
| G | 153 |
| B | 0 |
| α | 0 |
| class | batting |

| Point #36 | |
|---|---|
| ρ | 52.6 |
| φ | 53.8° |
| z | 54 |
| R | 204 |
| G | 153 |
| B | 0 |
| α | 0 |
| class | batting |

| Point #37 | |
|---|---|
| ρ | 52.1 |
| φ | 55.1° |
| z | 54 |
| R | 204 |
| G | 153 |
| B | 0 |
| α | 0 |
| class | batting |

| Point #38 | |
|---|---|
| ρ | 65.7 |
| φ | 20.7° |
| z | 52.7 |
| R | 204 |
| G | 153 |
| B | 0 |
| α | 0 |
| class | batting |

| Point #39 | |
|---|---|
| ρ | 65.2 |
| φ | 22° |
| z | 52.7 |
| R | 204 |
| G | 153 |
| B | 0 |
| α | 0 |
| class | batting |

| Point #40 | |
|---|---|
| ρ | 64.7 |
| φ | 23.3° |
| z | 52.7 |
| R | 204 |
| G | 153 |
| B | 0 |
| α | 0 |
| class | batting |

| Point #41 | |
|---|---|
| ρ | 57.3 |
| φ | 26.7° |
| z | 52.7 |
| R | 255 |
| G | 255 |
| B | 255 |
| α | 0 |
| class | batting |

| Point #42 | |
|---|---|
| ρ | 56.8 |
| φ | 28° |
| z | 52.7 |
| R | 255 |
| G | 255 |
| B | 255 |
| α | 0 |
| class | batting |

| Point #43 | |
|---|---|
| ρ | 56.3 |
| φ | 29.3° |
| z | 52.7 |
| R | 255 |
| G | 255 |
| B | 255 |
| α | 0 |
| class | batting |

| Point #44 | |
|---|---|
| ρ | 60.1 |
| φ | 35.5° |
| z | 52.7 |
| R | 204 |
| G | 153 |
| B | 0 |
| α | 0 |
| class | batting |

| Point #45 | |
|---|---|
| ρ | 58.6 |
| φ | 38.2° |
| z | 52.7 |
| R | 204 |
| G | 153 |
| B | 0 |
| α | 0 |
| class | batting |

| Point #46 | |
|---|---|
| ρ | 58.1 |
| φ | 39.5° |
| z | 52.7 |
| R | 204 |
| G | 153 |
| B | 0 |
| α | 0 |
| class | batting |

| Point #47 | |
|---|---|
| ρ | 57.6 |
| φ | 40.8° |
| z | 52.7 |
| R | 204 |
| G | 153 |
| B | 0 |
| α | 0 |
| class | batting |

| Point #48 | |
|---|---|
| ρ | 57.1 |
| φ | 42.1° |
| z | 52.7 |
| R | 204 |
| G | 153 |
| B | 0 |
| α | 0 |
| class | batting |

| Point #49 | |
|---|---|
| ρ | 56.6 |
| φ | 43.4° |
| z | 52.7 |
| R | 204 |
| G | 153 |
| B | 0 |
| α | 0 |
| class | batting |

| Point #50 | |
|---|---|
| ρ | 56.1 |
| φ | 44.7° |
| z | 52.7 |
| R | 204 |
| G | 153 |
| B | 0 |
| α | 0 |
| class | batting |

| Point #51 | |
|---|---|
| ρ | 55.6 |
| φ | 46° |
| z | 52.7 |
| R | 204 |
| G | 153 |
| B | 0 |
| α | 0 |
| class | batting |

| Point #52 | |
|---|---|
| ρ | 55.1 |
| φ | 47.3° |
| z | 52.7 |
| R | 204 |
| G | 153 |
| B | 0 |
| α | 0 |
| class | batting |

| Point #53 | |
|---|---|
| ρ | 58.8 |
| φ | 28° |
| z | 51.4 |
| R | 255 |
| G | 255 |
| B | 255 |
| α | 0 |
| class | batting |

| Point #1 | |
|---|---|
| ρ | 58.8 |
| φ | 28° |
| z | 55.2 |
| R | 255 |
| G | 255 |
| B | 255 |
| α | 0 |
| class | batting |

| Point #2 | |
|---|---|
| ρ | 65.4 |
| φ | 21.4° |
| z | 54.6 |
| R | 204 |
| G | 153 |
| B | 0 |
| α | 0 |
| class | batting |

| Point #3 | |
|---|---|
| ρ | 65.2 |
| φ | 22° |
| z | 54.6 |
| R | 204 |
| G | 153 |
| B | 0 |
| α | 0 |
| class | batting |

| Point #4 | |
|---|---|
| ρ | 65.0 |
| φ | 22.6° |
| z | 54.6 |
| R | 204 |
| G | 153 |
| B | 0 |
| α | 0 |
| class | batting |

| Point #5 | |
|---|---|
| ρ | 57.0 |
| φ | 27.4° |
| z | 54.6 |
| R | 255 |
| G | 255 |
| B | 255 |
| α | 0 |
| class | batting |

| Point #6 | |
|---|---|
| ρ | 56.8 |
| φ | 28° |
| z | 54.6 |
| R | 255 |
| G | 255 |
| B | 255 |
| α | 0 |
| class | batting |

| Point #7 | |
|---|---|
| ρ | 56.6 |
| φ | 28.6° |
| z | 54.6 |
| R | 255 |
| G | 255 |
| B | 255 |
| α | 0 |
| class | batting |

| Point #8 | |
|---|---|
| ρ | 57.0 |
| φ | 41.8° |
| z | 54.6 |
| R | 204 |
| G | 153 |
| B | 0 |
| α | 0 |
| class | batting |

| Point #9 | |
|---|---|
| ρ | 56.8 |
| φ | 42.4° |
| z | 54.6 |
| R | 204 |
| G | 153 |
| B | 0 |
| α | 0 |
| class | batting |

| Point #10 | |
|---|---|
| ρ | 56.6 |
| φ | 43.0° |
| z | 54.6 |
| R | 204 |
| G | 153 |
| B | 0 |
| α | 0 |
| class | batting |

| Point #11 | |
|---|---|
| ρ | 56.4 |
| φ | 43.6° |
| z | 54.6 |
| R | 204 |
| G | 153 |
| B | 0 |
| α | 0 |
| class | batting |

| Point #12 | |
|---|---|
| ρ | 56.2 |
| φ | 44.2° |
| z | 54.6 |
| R | 204 |
| G | 153 |
| B | 0 |
| α | 0 |
| class | batting |

| Point #13 | |
|---|---|
| ρ | 56.0 |
| φ | 44.8° |
| z | 54.6 |
| R | 204 |
| G | 153 |
| B | 0 |
| α | 0 |
| class | batting |

| Point #14 | |
|---|---|
| ρ | 55.8 |
| φ | 45.4° |
| z | 54.6 |
| R | 204 |
| G | 153 |
| B | 0 |
| α | 0 |
| class | batting |

| Point #15 | |
|---|---|
| ρ | 55.6 |
| φ | 46° |
| z | 54.6 |
| R | 204 |
| G | 153 |
| B | 0 |
| α | 0 |
| class | batting |

| Point #16 | |
|---|---|
| ρ | 55.4 |
| φ | 46.6° |
| z | 54.6 |
| R | 204 |
| G | 153 |
| B | 0 |
| α | 0 |
| class | batting |

| Point #17 | |
|---|---|
| ρ | 65.4 |
| φ | 21.4° |
| z | 54 |
| R | 204 |
| G | 153 |
| B | 0 |
| α | 0 |
| class | batting |

| Point #18 | |
|---|---|
| ρ | 65.2 |
| φ | 22° |
| z | 54 |
| R | 204 |
| G | 153 |
| B | 0 |
| α | 0 |
| class | batting |

| Point #19 | |
|---|---|
| ρ | 59.2 |
| φ | 26.8° |
| z | 54 |
| R | 255 |
| G | 255 |
| B | 255 |
| α | 0 |
| class | batting |

| Point #20 | |
|---|---|
| ρ | 57.0 |
| φ | 27.4° |
| z | 54 |
| R | 255 |
| G | 255 |
| B | 255 |
| α | 0 |
| class | batting |

| Point #21 | |
|---|---|
| ρ | 54.8 |
| φ | 28° |
| z | 54 |
| R | 255 |
| G | 255 |
| B | 255 |
| α | 0 |
| class | batting |

| Point #22 | |
|---|---|
| ρ | 56.6 |
| φ | 28.6° |
| z | 54 |
| R | 255 |
| G | 255 |
| B | 255 |
| α | 0 |
| class | batting |

| Point #23 | |
|---|---|
| ρ | 58.4 |
| φ | 29.2° |
| z | 54 |
| R | 255 |
| G | 255 |
| B | 255 |
| α | 0 |
| class | batting |

| Point #24 | |
|---|---|
| ρ | 56.8 |
| φ | 42.4° |
| z | 54 |
| R | 204 |
| G | 153 |
| B | 0 |
| α | 0 |
| class | batting |

| Point #25 | |
|---|---|
| ρ | 56.6 |
| φ | 43.0° |
| z | 54 |
| R | 204 |
| G | 153 |
| B | 0 |
| α | 0 |
| class | batting |

| Point #26 | |
|---|---|
| ρ | 56.4 |
| φ | 43.6° |
| z | 54 |
| R | 204 |
| G | 153 |
| B | 0 |
| α | 0 |
| class | batting |

| Point #27 | |
|---|---|
| ρ | 56.2 |
| φ | 44.2° |
| z | 54 |
| R | 204 |
| G | 153 |
| B | 0 |
| α | 0 |
| class | batting |

| Point #28 | |
|---|---|
| ρ | 56.0 |
| φ | 44.8° |
| z | 54 |
| R | 204 |
| G | 153 |
| B | 0 |
| α | 0 |
| class | batting |

| Point #29 | |
|---|---|
| ρ | 55.8 |
| φ | 45.4° |
| z | 54 |
| R | 204 |
| G | 153 |
| B | 0 |
| α | 0 |
| class | batting |

| Point #30 | |
|---|---|
| ρ | 55.6 |
| φ | 46° |
| z | 54 |
| R | 204 |
| G | 153 |
| B | 0 |
| α | 0 |
| class | batting |

| Point #31 | |
|---|---|
| ρ | 55.4 |
| φ | 46.6° |
| z | 54 |
| R | 204 |
| G | 153 |
| B | 0 |
| α | 0 |
| class | batting |

| Point #32 | |
|---|---|
| ρ | 55.2 |
| φ | 47.2° |
| z | 54 |
| R | 204 |
| G | 153 |
| B | 0 |
| α | 0 |
| class | batting |

| Point #33 | |
|---|---|
| ρ | 55.0 |
| φ | 47.8° |
| z | 54 |
| R | 204 |
| G | 153 |
| B | 0 |
| α | 0 |
| class | batting |

| Point #34 | |
|---|---|
| ρ | 54.8 |
| φ | 48.4° |
| z | 54 |
| R | 204 |
| G | 153 |
| B | 0 |
| α | 0 |
| class | batting |

| Point #35 | |
|---|---|
| ρ | 54.6 |
| φ | 49.0° |
| z | 54 |
| R | 204 |
| G | 153 |
| B | 0 |
| α | 0 |
| class | batting |

| Point #36 | |
|---|---|
| ρ | 54.4 |
| φ | 49.6° |
| z | 54 |
| R | 204 |
| G | 153 |
| B | 0 |
| α | 0 |
| class | batting |

| Point #37 | |
|---|---|
| ρ | 54.2 |
| φ | 50.2° |
| z | 54 |
| R | 204 |
| G | 153 |
| B | 0 |
| α | 0 |
| class | batting |

| Point #38 | |
|---|---|
| ρ | 65.4 |
| φ | 21.4° |
| z | 53.4 |
| R | 204 |
| G | 153 |
| B | 0 |
| α | 0 |
| class | batting |

| Point #39 | |
|---|---|
| ρ | 65.2 |
| φ | 22° |
| z | 53.4 |
| R | 204 |
| G | 153 |
| B | 0 |
| α | 0 |
| class | batting |

| Point #40 | |
|---|---|
| ρ | 65.0 |
| φ | 22.6° |
| z | 53.4 |
| R | 204 |
| G | 153 |
| B | 0 |
| α | 0 |
| class | batting |

| Point #41 | |
|---|---|
| ρ | 57.0 |
| φ | 27.4° |
| z | 53.4 |
| R | 255 |
| G | 255 |
| B | 255 |
| α | 0 |
| class | batting |

| Point #42 | |
|---|---|
| ρ | 56.8 |
| φ | 28° |
| z | 53.4 |
| R | 255 |
| G | 255 |
| B | 255 |
| α | 0 |
| class | batting |

| Point #43 | |
|---|---|
| ρ | 56.6 |
| φ | 28.6° |
| z | 53.4 |
| R | 255 |
| G | 255 |
| B | 255 |
| α | 0 |
| class | batting |

| Point #44 | |
|---|---|
| ρ | 57.0 |
| φ | 41.8° |
| z | 53.4 |
| R | 204 |
| G | 153 |
| B | 0 |
| α | 0 |
| class | batting |

| Point #45 | |
|---|---|
| ρ | 56.8 |
| φ | 42.4° |
| z | 53.4 |
| R | 204 |
| G | 153 |
| B | 0 |
| α | 0 |
| class | batting |

| Point #46 | |
|---|---|
| ρ | 56.6 |
| φ | 43.0° |
| z | 53.4 |
| R | 204 |
| G | 153 |
| B | 0 |
| α | 0 |
| class | batting |

| Point #47 | |
|---|---|
| ρ | 56.4 |
| φ | 43.6° |
| z | 53.4 |
| R | 204 |
| G | 153 |
| B | 0 |
| α | 0 |
| class | batting |

| Point #48 | |
|---|---|
| ρ | 56.2 |
| φ | 44.2° |
| z | 53.4 |
| R | 204 |
| G | 153 |
| B | 0 |
| α | 0 |
| class | batting |

| Point #49 | |
|---|---|
| ρ | 56.0 |
| φ | 44.8° |
| z | 53.4 |
| R | 204 |
| G | 153 |
| B | 0 |
| α | 0 |
| class | batting |

| Point #50 | |
|---|---|
| ρ | 55.8 |
| φ | 45.4° |
| z | 53.4 |
| R | 204 |
| G | 153 |
| B | 0 |
| α | 0 |
| class | batting |

| Point #51 | |
|---|---|
| ρ | 55.6 |
| φ | 46° |
| z | 53.4 |
| R | 204 |
| G | 153 |
| B | 0 |
| α | 0 |
| class | batting |

| Point #52 | |
|---|---|
| ρ | 55.4 |
| φ | 46.6° |
| z | 53.4 |
| R | 204 |
| G | 153 |
| B | 0 |
| α | 0 |
| class | batting |

| Point #53 | |
|---|---|
| ρ | 58.8 |
| φ | 28° |
| z | 52.8 |
| R | 255 |
| G | 255 |
| B | 255 |
| α | 0 |
| class | batting |

FIG. 11C

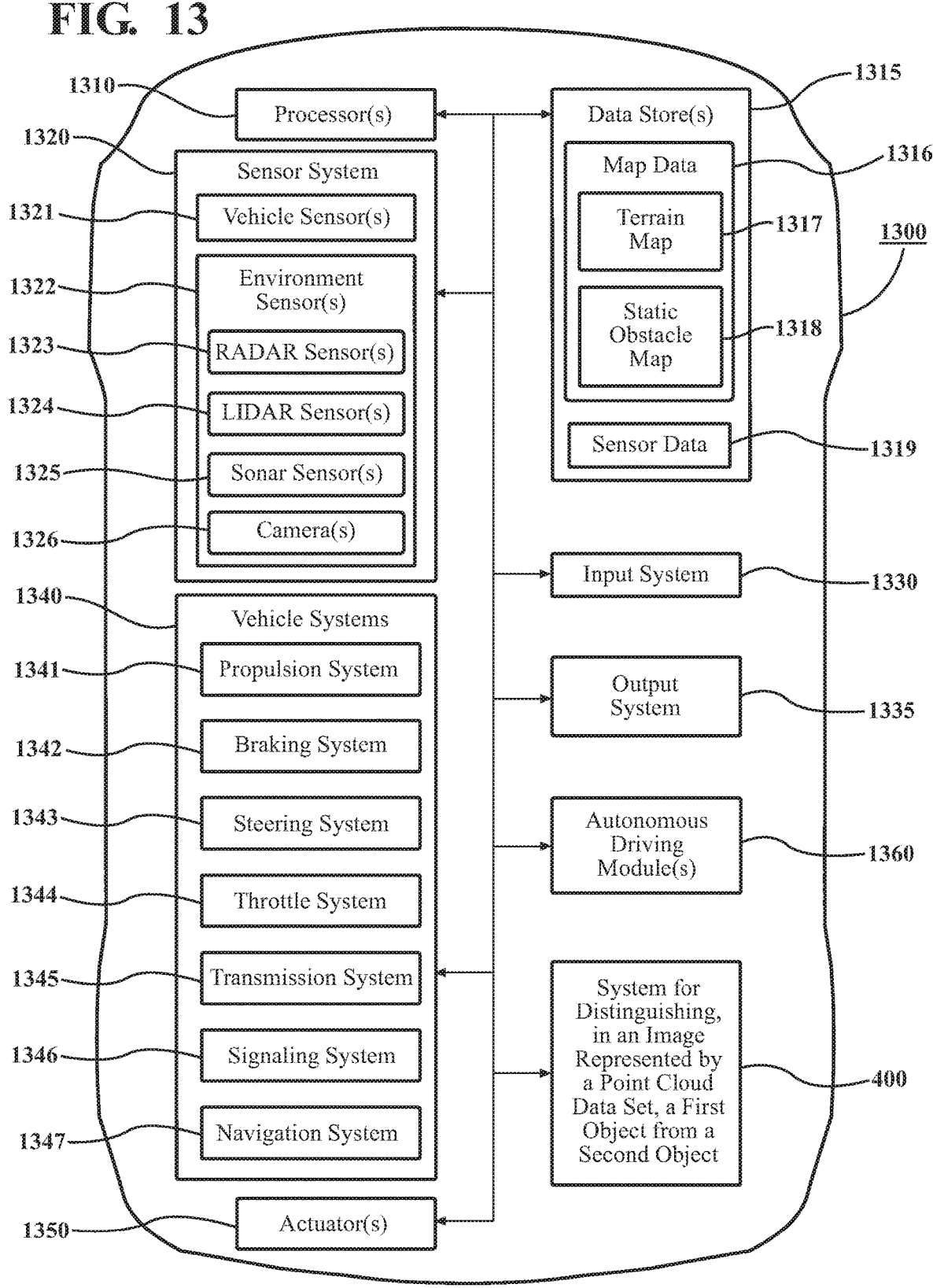

DISTINGUISHING, IN A POINT CLOUD DATA SET REPRESENTED BY AN IMAGE, A FIRST OBJECT FROM A SECOND OBJECT

TECHNICAL FIELD

The disclosed technologies are directed to causing, based on results of a set of functions in which current positions of points in a point cloud data set represented by an image are arguments for the functions, at least some of the points to move from the current positions to new positions so that a first object can be distinguished from a second object.

BACKGROUND

An environment can be represented by a point cloud data set. The point cloud data set can represent objects in a space and can be represented by an image. Data for a point in the point cloud data set can represent a position of the point in the space. The position can be defined by a coordinate system. The position can be, for example, on a surface of an object. In this manner, the point cloud dataset can represent the objects. Technologies that can produce the point cloud dataset can include, for example, a three-dimensional scanner and a light detection and ranging (lidar) system.

A lidar system can include a laser. The lidar system can cause the laser to emit pulses of a coherent light. Beams of the coherent light can be reflected from points on objects in a space in a vicinity of the lidar system. The lidar system can measure times of flight between emissions of the pulses and receptions of the beams reflected from the points. Distances between the lidar system and the points can be determined from the times of flight. The lidar system can cause the beams of coherent light to sweep through an arc defined, for example, with respect to a horizontal plane. A position of a point can be defined by a coordinate system that includes, for example, a distance between the lidar system and the point ($\rho$), a degree of angular rotation along the arc ($\varphi$), and a height above the horizontal plane (z).

SUMMARY

In an embodiment, a system for distinguishing, in a point cloud data set represented by an image, a first object from a second object can include one or more processors, a data store, and a memory. The data store can be communicably coupled to the one or more processors. The data store can store the point cloud data set. The memory can be communicably coupled to the one or more processors. The memory can store a functions module, a reposition module, an assessment module, a continuation module, and a distinguisher module. The functions module can include instructions that when executed by the one or more processors cause the one or more processors to calculate results of a set of functions. Current positions of points in the point cloud data set can be arguments for the functions. The set of functions can include attraction functions for the points and repulsion functions for the points. The reposition module can include instructions that when executed by the one or more processors cause the one or more processors to cause, based on the results, at least some of the points to move from the current positions to new positions. The assessment module can include instructions that when executed by the one or more processors cause the one or more processors to determine, based on the at least some of the points being at the new positions, an existence of a condition. The continuation module can include instructions that when executed by the one or more processors cause the one or more processors to repeat, in response to a lack of the existence of the condition and with the current positions for the at least some of the points being replaced by the new positions, the instructions of the functions module, the instructions of the reposition module, and the instructions of the assessment module. The distinguisher module can include instructions that when executed by the one or more processors cause the one or more processors to distinguish, in response to the existence of the condition and in the point cloud data set represented by the image with the at least some of the points being at the new positions, the first object from the second object.

In another embodiment, a method for distinguishing, in a point cloud data set represented by an image, a first object from a second object can include calculating, by a processor, results of a set of functions. Current positions of points in the point cloud data set can be arguments for the functions. The set of functions can include attraction functions for the points and repulsion functions for the points. The method can include causing, by the processor and based on the results, at least some of the points to move from the current positions to new positions. The method can include determining, by the processor and based on the at least some of the points being at the new positions, an existence of a condition. The method can include repeating, by the processor, in response to a lack of the existence of the condition, and with the current positions for the at least some of the points being replaced by the new positions, the calculating, the causing, and the determining. The method can include distinguishing, by the processor, in response to the existence of the condition, and in the point cloud data set represented by the image with the at least some of the points being at the new positions, the first object from the second object.

In another embodiment, a non-transitory computer-readable medium for distinguishing, in a point cloud data set represented by an image, a first object from a second object can include instructions that when executed by one or more processors cause the one or more processors to calculate results of a set of functions. Current positions of points in the point cloud data set can be arguments for the functions. The set of functions can include attraction functions for the points and repulsion functions for the points. The non-transitory computer-readable medium can include instructions that when executed by one or more processors cause the one or more processors to cause, based on the results, at least some of the points to move from the current positions to new positions. The non-transitory computer-readable medium can include instructions that when executed by one or more processors cause the one or more processors to determine, based on the at least some of the points being at the new positions, an existence of a condition. The non-transitory computer-readable medium can include instructions that when executed by one or more processors cause the one or more processors to repeat, in response to a lack of the existence of the condition and with the current positions for the at least some of the points being replaced by the new positions, the instructions that cause the one or more processors to calculate the results, the instructions that cause the one or more processors to cause the at least some of the points to move, and the instructions that cause the one or more processors to determine the existence of the condition. The non-transitory computer-readable medium can include instructions that when executed by one or more processors cause the one or more processors to distinguish, in response to the existence of the condition and in the point cloud data set represented by the image with the at least some of the points being at the new positions, the first object from the second object.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1 includes a diagram that illustrates a first example of an environment in which a point cloud data set can be produced by a lidar system.

FIG. 2 includes a diagram that illustrates a second example of the environment in which the point cloud data set can be produced by the lidar system.

FIGS. 5A through 5C include tables that illustrate a point cloud data set.

FIGS. 9A through 9C include tables that illustrate the point cloud data set after at least some of the points have been moved, in conjunction with the first iteration, to the new positions.

FIGS. 11A through 11C include tables that illustrate the point cloud data set after at least some of the points have been moved, in conjunction with the second iteration, to the new positions.

FIG. 13 includes a block diagram that illustrates an example of elements disposed on a vehicle, according to the disclosed technologies.

DETAILED DESCRIPTION

Figure 3:
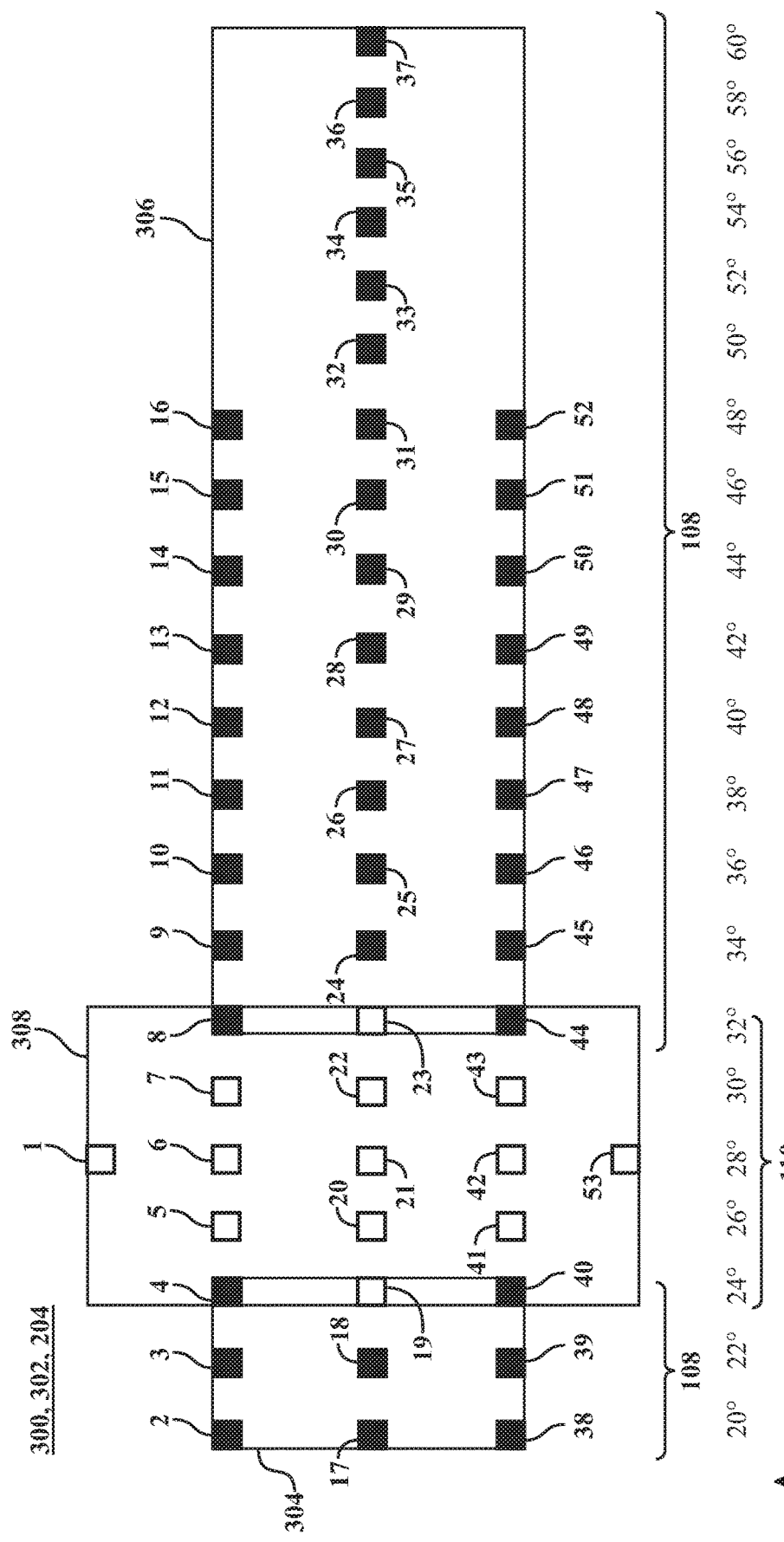
FIG. 3 includes a diagram that illustrates an example of an image associated with a set of points in a point cloud data set.

Because, in a point cloud data set, objects can be represented by data that represent positions of points on surfaces of the objects, the point cloud data set can be represented by an image in which distinguishing a first object from a second object can be difficult. If the point cloud data set was produced by a lidar system, then such a difficulty in distinguishing the first object from the second object can exist for one or more reasons. For example, because the image can be a two-dimensional representation of several objects in a three-dimensional space, a portion of the first object may be occluded, from a viewpoint of the lidar system, by the second object. For example, the points included in the point cloud data set typically can be of portions of outer surfaces of the objects that are within a line of sight of the lidar system and can exclude portions of the outer surfaces of the objects that are not within the line of sight of the lidar system and can exclude interior portions of the objects. For example, the points included in the point cloud data set may not represent boundaries of the surfaces of the objects. For example, an increase in spacings between the points associated with an increase in distances between the lidar system and the objects can result in one or more of the objects being represented by only a few points.

The disclosed technologies can be used, in a point cloud data set represented by an image, to distinguish a first object from a second object. Current positions of points in the point cloud data set can be arguments for functions of a set of functions. The set of functions can include attraction functions for the points and repulsion functions for the points. Results of the set of functions can be calculated. Based on the results, at least some of the points can be caused to move from the current positions to new positions. In the point cloud data set represented by the image with the at least some of the points being at the new positions, the first object can be distinguished from the second object.

FIG. 1 includes a diagram that illustrates a first example 102 of an environment 100 in which a first point cloud data set 104 can be produced by a lidar system 106. The environment 100 can include, for example, a first object 108 (e.g., a bat) and a second object 110 (e.g., a ball) arranged so that a portion of the first object 108 (e.g., the bat) can be occluded, from a viewpoint of the lidar system 106, by the second object 110 (e.g., the ball). In the first example 102, the lidar system 106 can produce the first point cloud data set 104 with points arrayed along an arc in an inclusive range from 10° to 80°.

FIG. 2 includes a diagram that illustrates a second example 202 of the environment 100 in which a second point cloud data set 204 can be produced by the lidar system 106. Distances between the lidar system 106 and both the first object 108 (e.g., the bat) and the second object 110 (e.g., the ball) in the second example 202 can be greater than the distances between the lidar system 106 and both the first object 108 (e.g., the bat) and the second object 110 (e.g., the ball) in the first example 102. In the second example 202, the lidar system 106 can produce the second point cloud data set 204 with points arrayed along the arc in an inclusive range from 20° to 60°. Because the distances between the lidar system 106 and both the first object 108 (e.g., the bat) and the second object 110 (e.g., the ball) in the second example 202 can be greater than the distances between the lidar system 106 and both the first object 108 (e.g., the bat) and the second object 110 (e.g., the ball) in the first example 102, spacings between points in the second point cloud data set 204 can be greater than the spacings between the points in the first point cloud data set 104. For at least this reason, in a point cloud data set represented by an image, distinguishing the first object 108 (e.g., the bat) from the second object 110 (e.g., the ball) can be more difficult in an image associated with the second point cloud data set 204 than in an image associated with the first point cloud data set 104.

FIG. 3 includes a diagram that illustrates an example of an image 300 associated with a set of points 302 in the second point cloud data set 204. The set of points 302 can include, for example, Point #1 through Point #53. Points of the set of points 302 can be arrayed along the arc in the inclusive range from 20° to 60°. Along this arc a spacing between two adjacent points can be, for example, two inches. At least because of the spacings between the points in the set of points 302, distinguishing the first object 108 (e.g., the bat) from the second object 110 (e.g., the ball) can be difficult.

Figure 4:
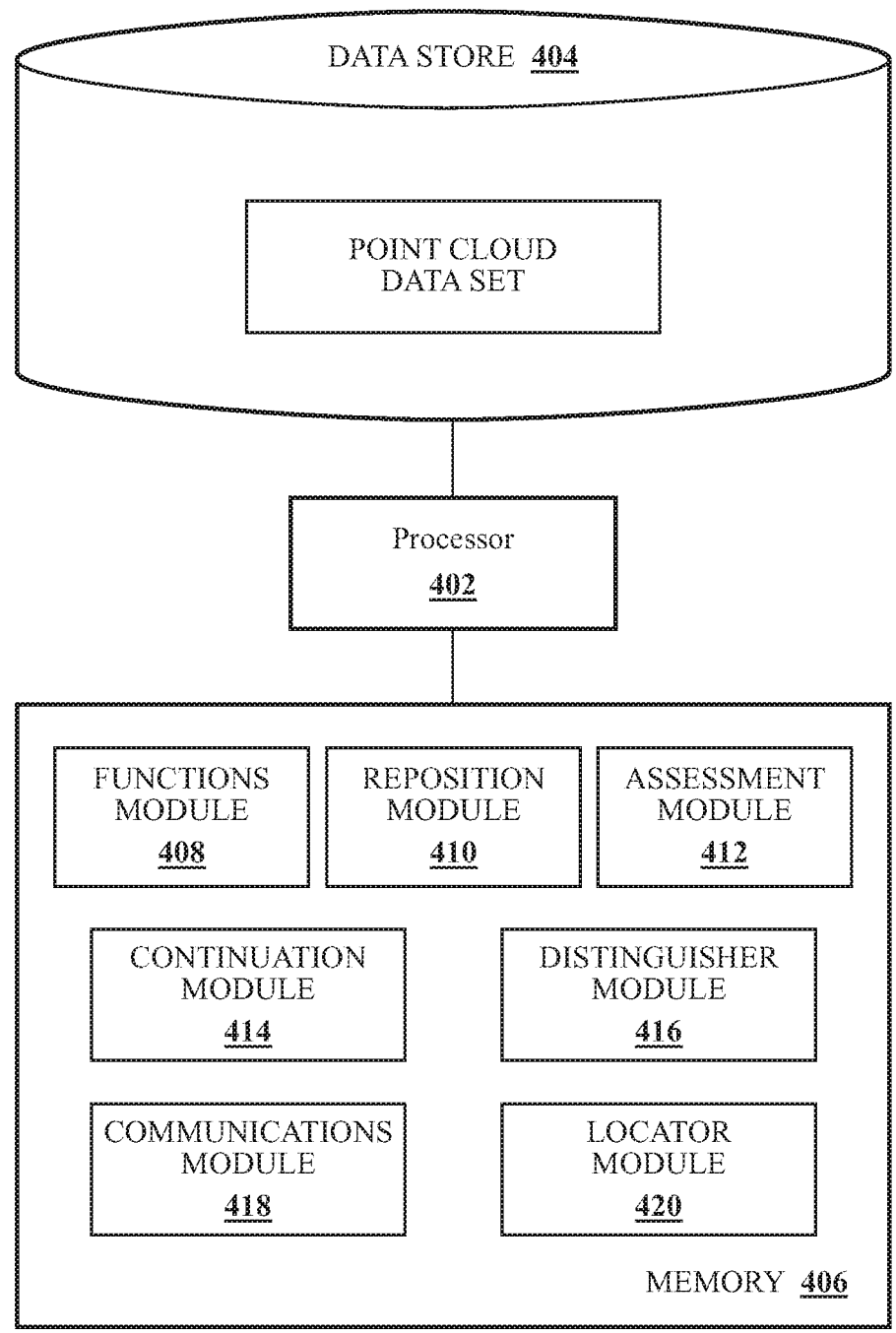
FIG. 4 includes a block diagram that illustrates an example of a system for distinguishing, in a point cloud data set represented by an image, a first object from a second object, according to the disclosed technologies.

FIG. 4 includes a block diagram that illustrates an example of a system 400 for distinguishing, in a point cloud data set represented by an image, a first object from a second object, according to the disclosed technologies. The system 400 can include, for example, a processor 402, a data store 404, and a memory 406. The data store 404 can be communicably coupled to the processor 402. The data store 404 can store, for example, the point cloud data set. For example, the point cloud data set can be the second point cloud data set 204 (illustrated in FIG. 2). The memory 406 can be communicably coupled to the processor 402. The memory 406 can store, for example, a functions module 408, a reposition module 410, an assessment module 412, a continuation module 414, and a distinguisher module 416. For example, the first object can be the first object 108 (e.g., the bat), the second object can be the second object 110 (e.g., the ball), and the point cloud data set can be the second point cloud data set 204 (illustrated in FIG. 2).

Additionally, the memory 406 can further store, for example, a communications module 418. The communications module 418 can include instructions that function to control the processor 402 to receive, from a lidar system, the point cloud data set. For example, the lidar system can be the lidar system 106 (illustrated in FIG. 2).

The functions module 408 can include instructions that function to control the processor 402 to calculate results of a set of functions. Current positions of points in the point cloud data set can be arguments for the functions. The set of functions can include attraction functions for the points and repulsion functions for the points.

An example of an attraction function can be:

$f\_a = \text{point\_1} - \text{point\_2}.$

For example, this attraction function can be weighted by a confidence factor such as:

Omega weighted $f\_a = f\_a'*\text{Omega}*f\_a,$ where ' indicates a transpose operation and Omega is usually derived from characteristics of the points. For example, if two points are very close to each other, then Omega can have a large value because there is a high likelihood that the two points are associated with a same object. One of skill in the art understands, in light of the description herein, that another attraction function can also be used.

An example of a repulsion function can be:

$f\_r = \max(0.0, \text{repulsion\_distance} - \text{norm}(\text{point\_1} - \text{point\_2})),$ where repulsion_distance determines at what distance (at a minimum) the two points should end up with respect to each other. Likewise, for example, this repulsion function can be weighted by a confidence factor such as:

Omega weighted $f\_r = f\_r'*\text{Omega}*f\_r.$

One of skill in the art understands, in light of the description herein, that another repulsion function can also be used.

For example, the instructions that function to control the processor 402 to calculate the results of the set of functions can control the processor 402 to calculate, for a point, the results of the set of functions. The set of functions can be calculated with respect to a set of points that includes the point. For example, the set of points can include all of the points in the point cloud data set. Alternatively, for example, the set of points can include the points in the point cloud data set that are within a threshold distance of the point. For example, with reference to FIG. 3, if the point is Point #18 and the threshold distance is three inches, then the set of points can include Point #2, Point #3, Point #4, Point #17, Point #18, Point #19, Point #38, Point #39, and Point #40. In this example, the instructions that function to control the processor 402 to calculate, for the Point #18, the results of the set of functions can calculate the results of the set of functions with respect to Point #2, Point #3, Point #4, Point #17, Point #19, Point #38, Point #39, and Point #40.

FIGS. 5A through 5C include tables that illustrate the second point cloud data set 204. For example, FIGS. 5A through 5C can include a table for each of Point #1 through Point #53. For example, original data for the points in the second point cloud data set 204 can represent a first feature 502 and a second feature. For example, the first feature 502 can be original positions of the points in the point cloud data set. For example, a position of a point can be defined by the distance between the lidar system 106 (illustrated in FIG. 2) and the point (ρ), the degree of angular rotation along the arc (φ), and the height above the horizontal plane (z). Alternatively, the position of the point can be defined by any other coordinate system including, for example, a Cartesian coordinate system.

The second feature can be, for example, one of: (1) colors of the points 504, (2) intensities of the points 506, or (3) information that identifies objects associated with the points 508. One of skill in the art understands, in light of the description herein, that the second feature can be other information associated with the points.

For example, the colors of the points 504 can be represented by the RGB color model in which a color can be represented by a combination of a value for a degree of intensity of a red color channel (R), a value for a degree of intensity of a green color channel (G), and a value for a degree of intensity of a blue color channel (B). Alternatively, the colors of the points 504 can be represented by any other color model including, for example, the CMY color model in which a color can be represented by a combination of a value for a degree of intensity of a cyan color channel (C), a value for a degree of intensity of a magenta color channel (M), and a value for a degree of intensity of a yellow color channel (Y) (not illustrated).

For example, the intensities of the points 506 can be represented by a value of an alpha channel (α) for a degree of transparency.

For example, the information that identifies the objects associated with the points 508 can be produced by a neural network (not illustrated) trained to classify images. For example, before the second point cloud data set 204 was stored in the data store 404 (illustrated in FIG. 4), the image 300 (illustrated in FIG. 3) can have been input to a neural network trained to classify images. The neural network can have determined that both the first object 108 (e.g., the bat) (illustrated in FIG. 3) and the second object 110 (e.g., the ball) (illustrated in FIG. 3) are associated with a "batting" class.

Additionally, the original data for the points in the second point cloud data set 204 can represent one or more third features. The one or more third features can be, for example, one of: (1) the colors of the points 504, (2) the intensities of the points 506, or (3) the information that identifies the objects associated with the points 508. The one or more third features can be different from the second feature. For example, if the second feature is the colors of the points 504, then the one or more third features can be: (1) the intensities of the points 506, (2) the information that identifies the objects associated with the points 508, or (3) both. Again, one of skill in the art understands, in light of the description herein, that the third feature can be other information associated with the points.

For example, the instructions that function to control the processor 402 to calculate the results of the set of functions can control the processor 402 to calculate the results of the set of functions by producing a factor graph for the point cloud data set. Vertices in the factor graph can correspond to the points in the point cloud data set. A first edge between a first vertex and a second vertex can corresponds to a measure of a first difference. The first difference can be between a value of the first feature for the first vertex and a value of the first feature for the second vertex. A second edge between the first vertex and the second vertex can corresponds to a measure of a second difference. The second difference can be between a value of the second feature for the first vertex and a value of the second feature for the second vertex.

Figure 6:
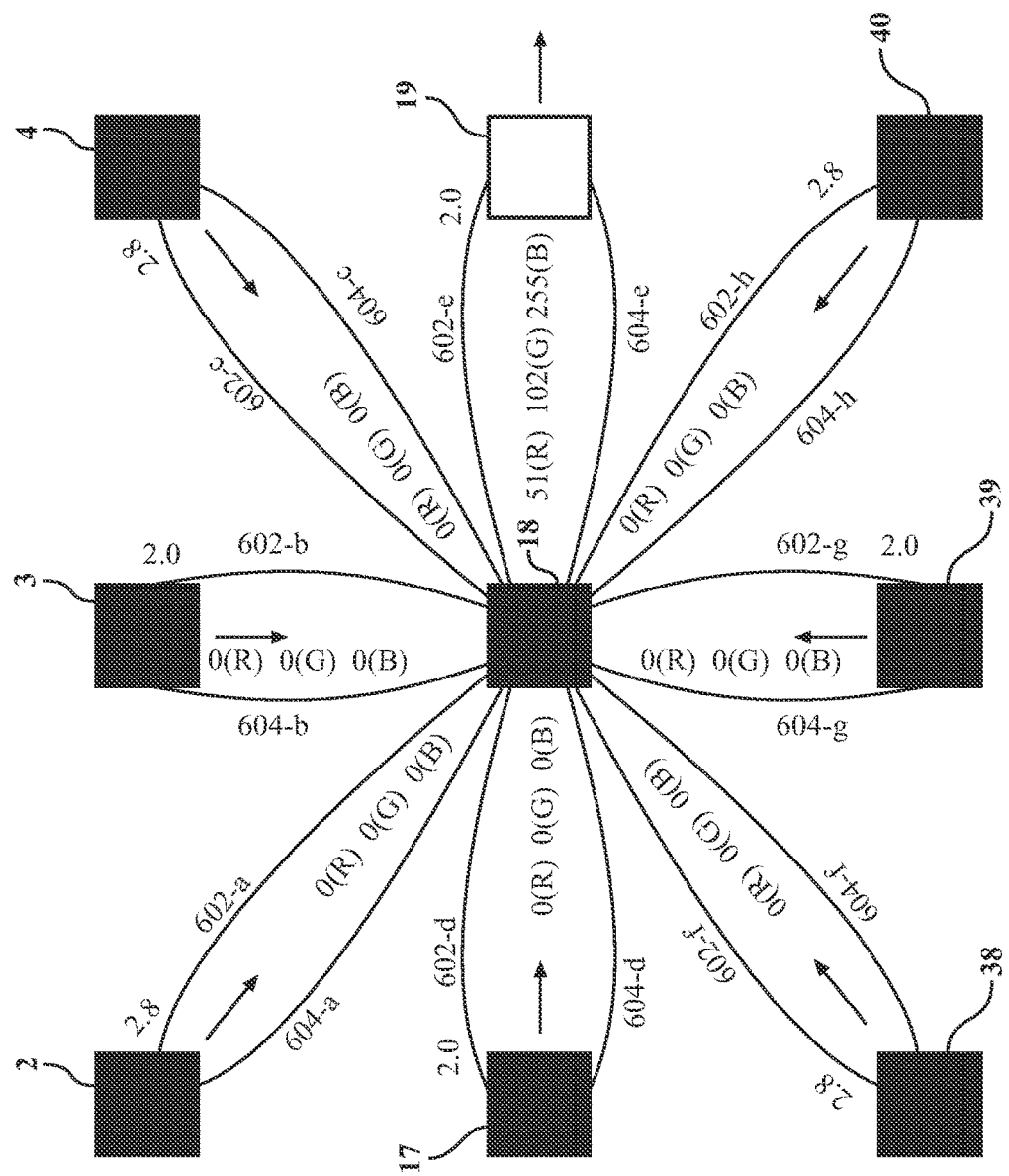
FIG. 6 includes a diagram that illustrates a first example of a factor graph to calculate, for a point, the results of the set of functions with respect to a set of points that are within a threshold distance of the point.

FIG. 6 includes a diagram that illustrates a first example of a factor graph 600 to calculate, for a point, the results of the set of functions with respect to a set of points that are within a threshold distance of the point. For example, with reference to FIG. 3, if the point is Point #18 and the threshold distance is three inches, then the set of points can include Point #2, Point #3, Point #4, Point #17, Point #19, Point #38, Point #39, and Point #40. In this example, Point #2, Point #3, Point #4, Point #17, Point #18, Point #19, Point #38, Point #39, and Point #40 can be the vertices of the factor graph 600. In this example, the first feature 502 can be positions of the points in the set of points (illustrated in FIGS. 5A through 5C) and the second feature can be colors of the points 504 in the set of points (illustrated in FIGS. 5A through 5C).

The factor graph 600 can include a first edge 602-a between Point #18 and Point #2, a first edge 602-b between Point #18 and Point #3, a first edge 602-c between Point #18 and Point #4, a first edge 602-d between Point #18 and Point #17, a first edge 602-e between Point #18 and Point #19, a first edge 602-f between Point #18 and Point #38, a first edge 602-g between Point #18 and Point #39, and a first edge 602-h between Point #18 and Point #40. The first edge 602-a has a value of 2.8, the first edge 602-b has a value of 2.0, the first edge 602-c has a value of 2.8, the first edge 602-d has a value of 2.0, the first edge 602-e has a value of 2.0, the first edge 602-f has a value of 2.8, the first edge 602-g has a value of 2.0, and the first edge 602-h has a value of 2.8.

The factor graph 600 can include a second edge 604-a between Point #18 and Point #2, a second edge 604-b between Point #18 and Point #3, a second edge 604-c between Point #18 and Point #4, a second edge 604-d between Point #18 and Point #17, a second edge 604-e between Point #18 and Point #19, a second edge 604-f between Point #18 and Point #38, a second edge 604-g between Point #18 and Point #39, and a second edge 604-h between Point #18 and Point #40. The second edge 604-a has values of 0 (R), 0 (G), and 0 (B); the second edge 604-b has values of 0 (R), 0 (G), and 0 (B); the second edge 604-c has values of 0 (R), 0 (G), and 0 (B); the second edge 604-d has values of 0 (R), 0 (G), and 0 (B); the second edge 604-e has values of 51 (R), 102 (G), and 255 (B); the second edge 604-f has values of 0 (R), 0 (G), and 0 (B); the second edge 604-g has values of 0 (R), 0 (G), and 0 (B); and the second edge 604-h has values of 0 (R), 0 (G), and 0 (B).

In an implementation, the instructions that function to control the processor 402 to calculate the results of the set of functions by producing a factor graph for the point cloud data set can calculate the results of the set of functions by: (1) associating a first probability with the first edge and (2) associating a second probability with the second edge.

Figure 7:
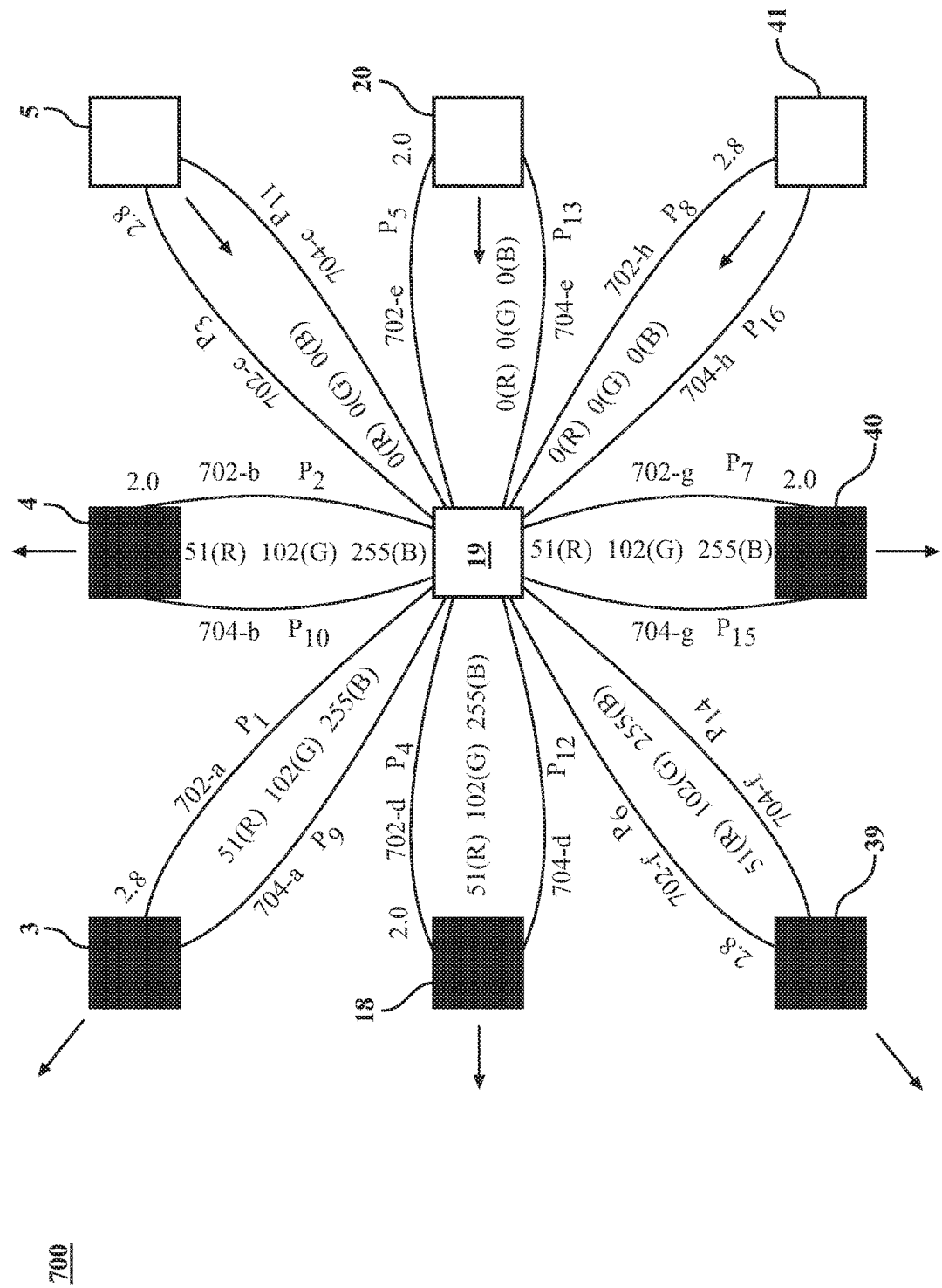
FIG. 7 includes a diagram that illustrates a second example of a factor graph to calculate, for a point, the results of the set of functions with respect to a set of points that are within a threshold distance of the point.

FIG. 7 includes a diagram that illustrates a second example of a factor graph 700 to calculate, for a point, the results of the set of functions with respect to a set of points that are within a threshold distance of the point. For example, with reference to FIG. 3, if the point is Point #19 and the threshold distance is three inches, then the set of points can include Point #3, Point #4, Point #5, Point #18, Point #20, Point #39, Point #40, and Point #41. In this example, Point #3, Point #4, Point #5, Point #18, Point #19, Point #20, Point #39, Point #40, and Point #41 can be the vertices of the factor graph 700. In this example, the first feature 502 can be positions of the points in the set of points (illustrated in FIGS. 5A through 5C) and the second feature can be colors of the points 504 in the set of points (illustrated in FIGS. 5A through 5C).

The factor graph 700 can include a first edge 702-a between Point #19 and Point #3, a first edge 702-b between Point #19 and Point #4, a first edge 702-c between Point #19 and Point #5, a first edge 702-d between Point #19 and Point #18, a first edge 702-e between Point #19 and Point #20, a first edge 702-f between Point #19 and Point #39, a first edge 702-g between Point #19 and Point #40, and a first edge 702-h between Point #19 and Point #41. The first edge 702-a has a value of 2.8 and an associated probability of $P_1$, the first edge 702-b has a value of 2.0 and an associated probability of $P_2$, the first edge 702-c has a value of 2.8 and an associated probability of $P_3$, the first edge 702-d has a value of 2.0 and an associated probability of $P_4$, the first edge 702-e has a value of 2.0 and an associated probability of $P_5$, the first edge 702-f has a value of 2.8 and an associated probability of $P_6$, the first edge 702-g has a value of 2.0 and an associated probability of $P_7$, and the first edge 702-h has a value of 2.8 and an associated probability of $P_8$.

The factor graph 700 can include a second edge 704-a between Point #19 and Point #3, a second edge 704-b between Point #19 and Point #4, a second edge 704-c between Point #19 and Point #5, a second edge 704-d between Point #19 and Point #18, a second edge 704-e between Point #19 and Point #20, a second edge 704-f between Point #19 and Point #39, a second edge 704-g between Point #19 and Point #40, and a second edge 704-h between Point #19 and Point #41. The second edge 704-a has values of 51 (R), 102 (G), and 255 (B) and an associated probability of $P_9$; the second edge 704-b has values of 51 (R), 102 (G), and 255 (B) and an associated probability of $P_{10}$; the second edge 704-c has values of 0 (R), 0 (G), and 0 (B) and an associated probability of $P_{11}$; the second edge 704-d has values of 51 (R), 102 (G), and 255 (B) and an associated probability of $P_{12}$; the second edge 704-e has values of 0 (R), 0 (G), and 0 (B) and an associated probability of $P_{13}$; the second edge 704-f has values of 51 (R), 102 (G), and 255 (B) and an associated probability of $P_{14}$; the second edge 704-g has values of 51 (R), 102 (G), and 255

(B) and an associated probability of $P_{15}$; and the second edge 704-*h* has values of 0 (R), 0 (G), and 0 (B) and an associated probability of $P_{16}$.

Returning to FIG. 4, the reposition module 410 can include instructions that function to control the processor 402 to cause, based on the results of the set of functions, at least some of the points to move from the current positions to new positions.

For example, with reference to FIG. 6, based on the results of the set of functions: Point #2 can be moved from its current position to a new position closer to Point #18, Point #3 can be moved from its current position to a new position closer to Point #18, Point #4 can be moved from its current position to a new position closer to Point #18, Point #17 can be moved from its current position to a new position closer to Point #18, Point #19 can be moved from its current position to a new position farther from Point #18, Point #38 can be moved from its current position to a new position closer to Point #18, Point #39 can be moved from its current position to a new position closer to Point #18, and Point #40 can be moved from its current position to a new position closer to Point #18.

For example, with reference to FIG. 7, based on the results of the set of functions: Point #3 can be moved from its current position to a new position farther from Point #19, Point #4 can be moved from its current position to a new position farther from Point #19, Point #5 can be moved from its current position to a new position closer to Point #19, Point #18 can be moved from its current position to a new position farther from Point #19, Point #20 can be moved from its current position to a new position closer to Point #19, Point #39 can be moved from its current position to a new position farther from Point #19, Point #40 can be moved from its current position to a new position farther from Point #19, and Point #41 can be moved from its current position to a new position closer to Point #19.

Figure 8:
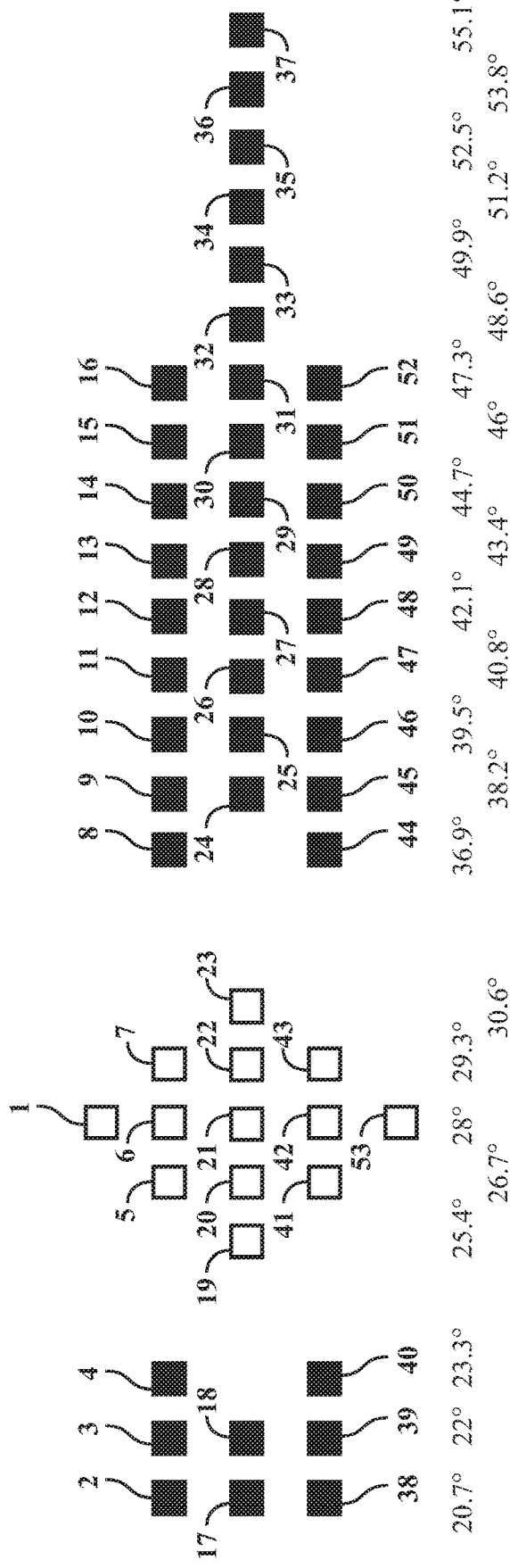
FIG. 8 includes a diagram that illustrates an example of the image associated with the set of points in the point cloud data set after at least some of the points have been moved, in conjunction with a first iteration, to the new positions.

FIG. 8 includes a diagram that illustrates an example of the image 300 associated with the set of points 302 in the second point cloud data set 204 after at least some of the points have been moved, in conjunction with a first iteration, to the new positions.

FIGS. 9A through 9C include tables that illustrate the second point cloud data set 204 after at least some of the points have been moved, in conjunction with the first iteration, to the new positions.

Returning to FIG. 4, the assessment module 412 can include instructions that function to control the processor 402 to determine, based on the at least some of the points being at the new positions, an existence of a condition. For example, the condition can include a loss function being at a minimum value. For example, the loss function can be equal to a sum of results of the attraction functions for the points added to a sum of results of the repulsion functions for the points. In the implementation in which the instructions that function to control the processor 402 to calculate the results of the set of functions includes: (1) associating the first probability with the first edge and (2) associating the second probability with the second edge, the instructions that function to control the processor 402 to determine the existence of the condition can determine the existence of the condition in a manner that accounts for the first probability and the second probability.

The continuation module 414 can include instructions that function to control the processor 402 to repeat, in response to a lack of the existence of the condition and with the current positions for the at least some of the points being replaced by the new positions, the instructions of the functions module 408, the instructions of the reposition module 410, and the instructions of the assessment module 412.

Figure 10:
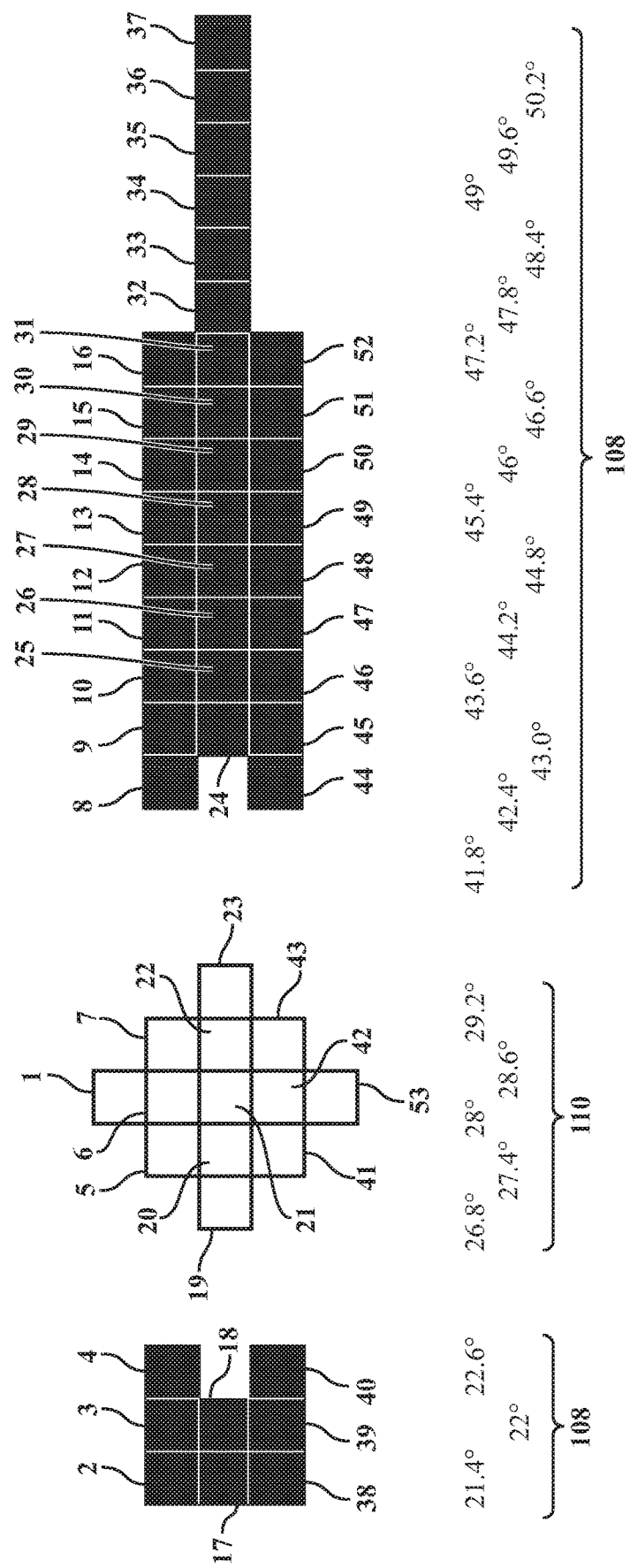
FIG. 10 includes a diagram that illustrates an example of the image associated with the set of points in the point cloud data set after at least some of the points have been moved, in conjunction with a second iteration, to the new positions.

FIG. 10 includes a diagram that illustrates an example of the image 300 associated with the set of points 302 in the second point cloud data set 204 after at least some of the points have been moved, in conjunction with a second iteration, to the new positions.

FIGS. 11A through 11C include tables that illustrate the second point cloud data set 204 after at least some of the points have been moved, in conjunction with the second iteration, to the new positions.

Returning to FIG. 4, the distinguisher module 416 can include instructions that function to control the processor 402 to distinguish, in response to the existence of the condition and in the point cloud data set represented by the image with the at least some of the points being at the new positions, the first object from the second object. For example, with reference to FIG. 10, the instructions that function to control the processor 402 to distinguish the first object from the second object can distinguish the first object 108 (e.g., the bat) from the second object 110 (e.g., the ball). For example, the instructions that function to control the processor 402 to distinguish the first object from the second object can cluster the points in the point cloud data set with the at least some of the points being at the new positions.

Returning to FIG. 4, additionally, the memory 406 can further store, for example, a locator module 420. The locator module 420 can include instructions that function to control the processor 402 to determine, in response to a determination of a distinction between the first object and the second object and in the point cloud data set represented by the image with the points being at the original positions, locations of the first object and the second object. For example, with reference to FIG. 3, the instructions that function to control the processor 402 to determine, in the point cloud data set represented by the image with the points being at the original positions, the locations of the first object and the second object can determine the locations of the first object 108 (e.g., the bat) and the second object 110 (e.g., the ball). For example, the instructions that function to control the processor 402 to determine, in the point cloud data set represented by the image with the points being at the original positions, the locations of the first object and the second object can produce: (1) bounding boxes 304 and 306 for the first object 108 (e.g., the bat) and (2) a bounding box 308 for the second object 110 (e.g., the ball). For example, the instructions that function to control the processor 402 to determine, in the point cloud data set represented by the image with the points being at the original positions, the locations of the first object and the second object can segment the image associated with the point cloud data set with the points being at the original positions.

Figure 12:
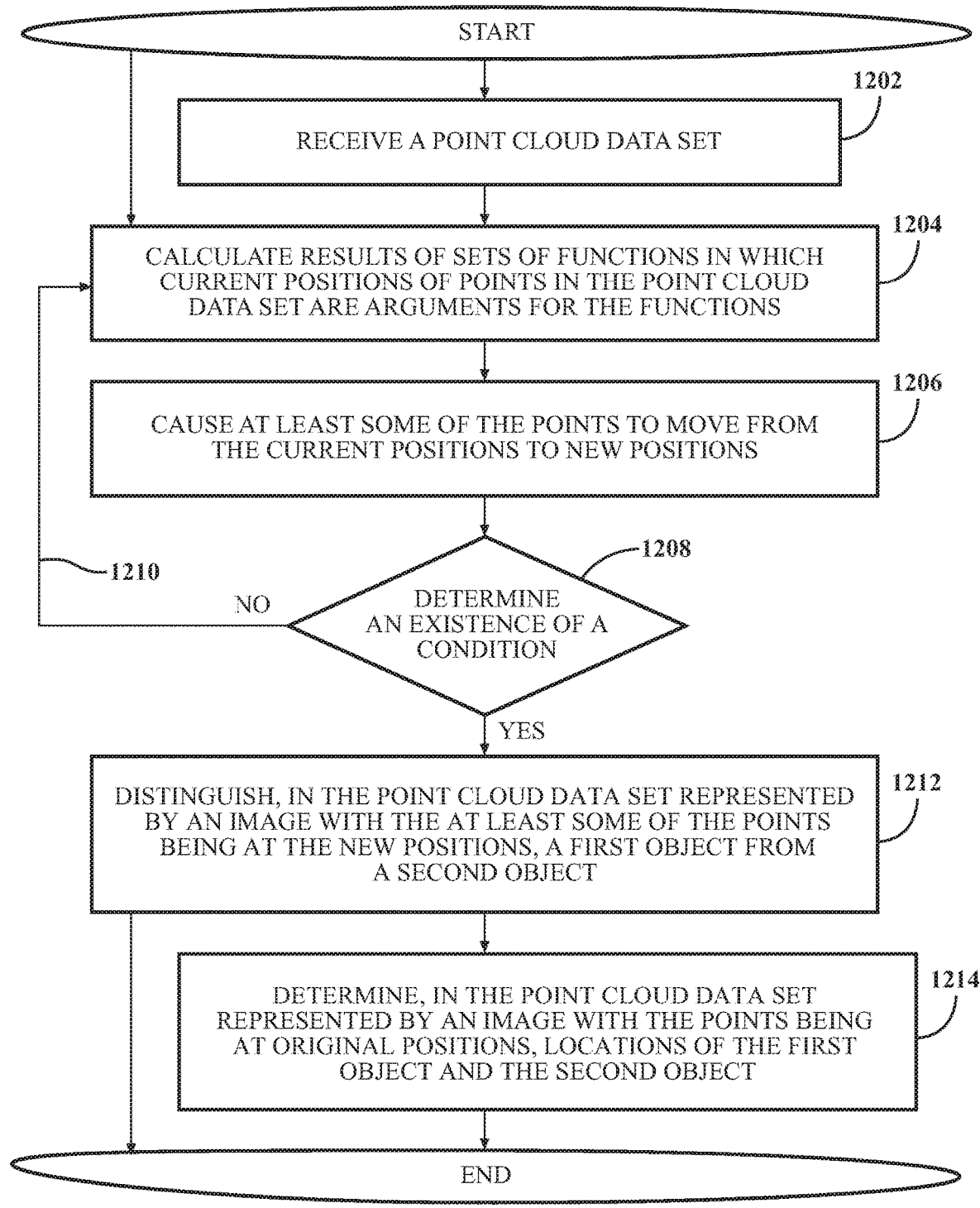
FIG. 12 includes a flow diagram that illustrates an example of a method that is associated with distinguishing, in a point cloud data set represented by an image, a first object from a second object, according to the disclosed technologies.

FIG. 12 includes a flow diagram that illustrates an example of a method 1200 that is associated with distinguishing, in a point cloud data set represented by an image, a first object from a second object, according to the disclosed technologies. The method 1200 is described from the perspective of the system 400 illustrated in FIG. 4. Although the method 1200 is described in combination with the system 400, one of skill in the art understands, in light of the description herein, that the method 1200 is not limited to being implemented by the system 400. Rather, the system 400 is an example of a system that may be used to implement the method 1200.

In FIG. 12, in the method 1200, in an implementation, at an operation 1202, the processor 402 can receive, from a lidar system, the point cloud data set. The point cloud data set can be stored in the data store 404.

At an operation 1204, the processor 402 can calculate results of a set of functions. Current positions of points in the point cloud data set can be arguments for the functions. The set of functions can include attraction functions for the points and repulsion functions for the points.

For example, the processor 402 can calculate the results of the set of functions can by calculating, for a point, the results of the set of functions. The set of functions can be calculated with respect to a set of points that includes the point. For example, the set of points can include all of the points in the point cloud data set. Alternatively, for example, the set of points can include the points in the point cloud data set that are within a threshold distance of the point.

For example, original data for the points in the point cloud data set can represent a first feature and a second feature. For example, the first feature can be original positions of the points in the image. For example, the second feature can be one of: (1) colors of the points, (2) intensities of the points, or (3) information that identifies objects associated with the points. Additionally, the original data for the points in the point cloud data set can represent one or more third features. The one or more third features can be, for example, one of: (1) the one of the colors of the points, (2) the intensities of the points, or (3) the information that identifies the objects associated with the points. The one or more third features can be different from the second feature. One of skill in the art understands, in light of the description herein, that the second feature, the third feature, or both can be other information associated with the points.

For example, the processor 402 can calculate the results of the set of functions can by producing a factor graph for the point cloud data set. Vertices in the factor graph can correspond to the points in the point cloud data set. A first edge between a first vertex and a second vertex can correspond to a measure of a first difference. The first difference can be between a value of the first feature for the first vertex and a value of the first feature for the second vertex. A second edge between the first vertex and the second vertex can correspond to a measure of a second difference. The second difference can be between a value of the second feature for the first vertex and a value of the second feature for the second vertex. In an implementation, the processor 402 can calculate the results of the set of functions by producing the factor graph for the point cloud data set and: (1) associating a first probability with the first edge and (2) associating a second probability with the second edge.

At an operation 1206, the processor 402 can cause, based on the results of the set of functions, at least some of the points to move from the current positions to new positions.

At an operation 1208, the processor 402 can determine, based on the at least some of the points being at the new positions, an existence of a condition. For example, the condition can include a loss function being at a minimum value. For example, the loss function can be equal to a sum of results of the attraction functions for the points added to a sum of results of the repulsion functions for the points. In the implementation in which the processor 402 can calculate the results of the set of functions by producing the factor graph for the point cloud data set and: (1) associating a first probability with the first edge and (2) associating a second probability with the second edge, the processor 402 can determine the existence of the condition in a manner that accounts for the first probability and the second probability.

At an operation 1210, the processor 402, can repeat, in response to a lack of the existence of the condition and with the current positions for the at least some of the points being replaced by the new positions, the operation 1204, the operation 1206, and the operation 1208.

At an operation 1212, the processor 402 can distinguish, in response to the existence of the condition and in the point cloud data set represented by the image with the at least some of the points being at the new positions, the first object from the second object. For example, the processor 402 can distinguish the first object from the second object by clustering the points in the point cloud data set with the at least some of the points being at the new positions.

Additionally, at an operation 1214, the processor 402 can determine, in response to a determination of a distinction between the first object and the second object and in the point cloud data set represented by the image with the points being at original positions, locations of the first object and the second object. For example, the processor 402 can determine the locations of the first object and the second object by segmenting the image associated with the point cloud data set with the points being at the original positions.

In an image associated with a point cloud data set produced by a lidar system, an ability to distinguish a first object from a second object can be important because such an image can be used by an autonomous vehicle to perform several functions including, for example, localization, map generation, and obstacle avoidance.

FIG. 13 includes a block diagram that illustrates an example of elements disposed on a vehicle 1300, according to the disclosed technologies. As used herein, a "vehicle" can be any form of powered transport. In one or more implementations, the vehicle 130 can be an automobile. While arrangements described herein are with respect to automobiles, one of skill in the art understands, in light of the description herein, that embodiments are not limited to automobiles.

In some embodiments, the vehicle 1300 can be configured to switch selectively between an autonomous mode, one or more semi-autonomous operational modes, and/or a manual mode. Such switching can be implemented in a suitable manner, now known or later developed. As used herein, "manual mode" can refer that all of or a majority of the navigation and/or maneuvering of the vehicle 1300 is performed according to inputs received from a user (e.g., human driver). In one or more arrangements, the vehicle 1300 can be a conventional vehicle that is configured to operate in only a manual mode.

In one or more embodiments, the vehicle 1300 can be an autonomous vehicle. As used herein, "autonomous vehicle" can refer to a vehicle that operates in an autonomous mode. As used herein, "autonomous mode" can refer to navigating and/or maneuvering the vehicle 1300 along a travel route using one or more computing systems to control the vehicle 1300 with minimal or no input from a human driver. In one or more embodiments, the vehicle 1300 can be highly automated or completely automated. In one embodiment, the vehicle 1300 can be configured with one or more semi-autonomous operational modes in which one or more computing systems perform a portion of the navigation and/or maneuvering of the vehicle along a travel route, and a vehicle operator (i.e., driver) provides inputs to the vehicle 1300 to perform a portion of the navigation and/or maneuvering of the vehicle 1300 along a travel route.

The vehicle 1300 can include various elements. The vehicle 1300 can have any combination of the various elements illustrated in FIG. 13. In various embodiments, it may not be necessary for the vehicle 1300 to include all of the elements illustrated in FIG. 13. Furthermore, the vehicle 1300 can have elements in addition to those illustrated in FIG. 13. While the various elements are illustrated in FIG. 13 as being located within the vehicle 1300, one or more of these elements can be located external to the vehicle 1300. Furthermore, the elements illustrated may be physically separated by large distances. For example, as described, one or more components of the disclosed system can be implemented within the vehicle 1300 while other components of the system can be implemented within a cloud-computing environment, as described below. For example, the elements can include one or more processors 1310, one or more data stores 1315, a sensor system 1320, an input system 1330, an output system 1335, vehicle systems 1340, one or more actuators 1350, one or more autonomous driving modules 1360, and the system 400 for distinguishing, in an image represented by a point cloud data set, a first object from a second object.

In one or more arrangements, the one or more processors 1310 can be a main processor of the vehicle 1300. For example, the one or more processors 1310 can be an electronic control unit (ECU). For example, functions and/or operations of the processor 402 (illustrated in FIG. 4) can be realized by the one or more processors 1310.

The one or more data stores 1315 can store, for example, one or more types of data. For example, functions and/or operations of the data store 404 and/or the memory 406 (illustrated in FIG. 4) can be realized by the one or more data stores 1315. The one or more data store 1315 can include volatile memory and/or non-volatile memory. Examples of suitable memory for the one or more data stores 1315 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 1315 can be a component of the one or more processors 1310. Additionally or alternatively, the one or more data stores 1315 can be operatively connected to the one or more processors 1310 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 1315 can store map data 1316. The map data 1316 can include maps of one or more geographic areas. In some instances, the map data 1316 can include information or data on roads, traffic control devices, road markings, structures, features, and/or landmarks in the one or more geographic areas. The map data 1316 can be in any suitable form. In some instances, the map data 1316 can include aerial views of an area. In some instances, the map data 1316 can include ground views of an area, including 360-degree ground views. The map data 1316 can include measurements, dimensions, distances, and/or information for one or more items included in the map data 1316 and/or relative to other items included in the map data 1316. The map data 1316 can include a digital map with information about road geometry. The map data 1316 can be high quality and/or highly detailed.

In one or more arrangements, the map data 1316 can include one or more terrain maps 1317. The one or more terrain maps 1317 can include information about the ground, terrain, roads, surfaces, and/or other features of one or more geographic areas. The one or more terrain maps 1317 can include elevation data of the one or more geographic areas. The map data 1316 can be high quality and/or highly detailed. The one or more terrain maps 1317 can define one or more ground surfaces, which can include paved roads, unpaved roads, land, and other things that define a ground surface.

In one or more arrangements, the map data 1316 can include one or more static obstacle maps 1318. The one or more static obstacle maps 1318 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 1318 can have location data, size data, dimension data, material data, and/or other data associated with them. The one or more static obstacle maps 1318 can include measurements, dimensions, distances, and/or information for one or more static obstacles. The one or more static obstacle maps 1318 can be high quality and/or highly detailed. The one or more static obstacle maps 1318 can be updated to reflect changes within a mapped area.

In one or more arrangements, the one or more data stores 1315 can store sensor data 1319. As used herein, "sensor data" can refer to any information about the sensors with which the vehicle 1300 can be equipped including the capabilities of and other information about such sensors. The sensor data 1319 can relate to one or more sensors of the sensor system 1320. For example, in one or more arrangements, the sensor data 1319 can include information about one or more lidar sensors 1324 of the sensor system 1320. For example, functions and/or operations of the lidar system 106 (illustrated in FIGS. 1 and 2) can be realized by the one or more lidar sensors 1324.

In some arrangements, at least a portion of the map data 1316 and/or the sensor data 1319 can be located in one or more data stores 1315 that are located onboard the vehicle 1300. Alternatively or additionally, at least a portion of the map data 1316 and/or the sensor data 1319 can be located in one or more data stores 1315 that are located remotely from the vehicle 1300.

The sensor system 1320 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 1320 includes a plurality of sensors, the sensors can work independently from each other. Alternatively, two or more of the sensors can work in combination with each other. In such a case, the two or more sensors can form a sensor network. The sensor system 1320 and/or the one or more sensors can be operatively connected to the one or more processors 1310, the one or more data stores 1315, and/or another element of the vehicle 1300 (including any of the elements illustrated in FIG. 13). The sensor system 1320 can acquire data of at least a portion of the external environment of the vehicle 1300 (e.g., nearby vehicles). The sensor system 1320 can include any suitable type of sensor. Various examples of different types of sensors are described herein. However, one of skill in the art understands that the embodiments are not limited to the particular sensors described herein.

The sensor system 1320 can include one or more vehicle sensors 1321. The one or more vehicle sensors 1321 can detect, determine, and/or sense information about the vehicle 1300 itself. In one or more arrangements, the one or more vehicle sensors 1321 can be configured to detect and/or sense position and orientation changes of the vehicle 1300 such as, for example, based on inertial acceleration. In one or more arrangements, the one or more vehicle sensors 1321 can include one or more accelerometers, one or more gyroscopes, an inertial measurement unit (IMU), a dead-reckoning system, a global navigation satellite system (GNSS), a global positioning system (GPS), a navigation system 1347, and/or other suitable sensors. The one or more vehicle sensors 1321 can be configured to detect and/or sense one or more characteristics of the vehicle 1300. In one or more arrangements, the one or more vehicle sensors 1321 can include a speedometer to determine a current speed of the vehicle 1300.

Alternatively or additionally, the sensor system 1320 can include one or more environment sensors 1322 configured to acquire and/or sense driving environment data. As used herein, "driving environment data" can include data or information about the external environment in which a vehicle is located or one or more portions thereof. For example, the one or more environment sensors 1322 can be configured to detect, quantify, and/or sense obstacles in at least a portion of the external environment of the vehicle 1300 and/or information/data about such obstacles. Such obstacles may be stationary objects and/or dynamic objects. The one or more environment sensors 1322 can be configured to detect, measure, quantify, and/or sense other things in the external environment of the vehicle 1300 such as, for example, lane markers, signs, traffic lights, traffic signs, lane lines, crosswalks, curbs proximate the vehicle 1300, off-road objects, etc.

Various examples of sensors of the sensor system 1320 are described herein. The example sensors may be part of the one or more vehicle sensors 1321 and/or the one or more environment sensors 1322. However, one of skill in the art understands that the embodiments are not limited to the particular sensors described.

In one or more arrangement, the one or more environment sensors 1322 can include one or more radar sensors 1323, one or more lidar sensors 1324, one or more sonar sensors 1325, and/or one more cameras 1326. In one or more arrangements, the one or more cameras 1326 can be one or more high dynamic range (HDR) cameras or one or more infrared (IR) cameras. For example, the one or more cameras 1326 can be used to record a reality of a state of an item of information that can appear in digital map.

The input system 1330 can include any device, component, system, element, arrangement, or groups thereof that enable information/data to be entered into a machine. The input system 1330 can receive an input from a vehicle passenger (e.g., a driver or a passenger). The output system 1335 can include any device, component, system, element, arrangement, or groups thereof that enable information/data to be presented to a vehicle passenger (e.g., a driver or a passenger).

Various examples of the one or more vehicle systems 1340 are illustrated in FIG. 13. However, one of skill in the art understands that the vehicle 1300 can include more, fewer, or different vehicle systems. Although particular vehicle systems can be separately defined, each or any of the systems or portions thereof may be otherwise combined or segregated via hardware and/or software within the vehicle 1300. For example, the one or more vehicle systems 1340 can include a propulsion system 1341, a braking system 1342, a steering system 1343, a throttle system 1344, a transmission system 1345, a signaling system 1346, and/or the navigation system 1347. Each of these systems can include one or more devices, components, and/or a combination thereof, now known or later developed.

The navigation system 1347 can include one or more devices, applications, and/or combinations thereof, now known or later developed, configured to determine the geographic location of the vehicle 1300 and/or to determine a travel route for the vehicle 1300. The navigation system 1347 can include one or more mapping applications to determine a travel route for the vehicle 1300. The navigation system 1347 can include a global positioning system, a local positioning system, a geolocation system, and/or a combination thereof.

The one or more actuators 1350 can be any element or combination of elements operable to modify, adjust, and/or alter one or more of the vehicle systems 1340 or components thereof responsive to receiving signals or other inputs from the one or more processors 1310 and/or the one or more autonomous driving modules 1360. Any suitable actuator can be used. For example, the one or more actuators 1350 can include motors, pneumatic actuators, hydraulic pistons, relays, solenoids, and/or piezoelectric actuators.

The one or more processors 1310 and/or the one or more autonomous driving modules 1360 can be operatively connected to communicate with the various vehicle systems 1340 and/or individual components thereof. For example, the one or more processors 1310 and/or the one or more autonomous driving modules 1360 can be in communication to send and/or receive information from the various vehicle systems 1340 to control the movement, speed, maneuvering, heading, direction, etc. of the vehicle 1300. The one or more processors 1310 and/or the one or more autonomous driving modules 1360 may control some or all of these vehicle systems 1340 and, thus, may be partially or fully autonomous.

The one or more processors 1310 and/or the one or more autonomous driving modules 1360 may be operable to control the navigation and/or maneuvering of the vehicle 1300 by controlling one or more of the vehicle systems 1340 and/or components thereof. For example, when operating in an autonomous mode, the one or more processors 1310 and/or the one or more autonomous driving modules 1360 can control the direction and/or speed of the vehicle 1300. The one or more processors 1310 and/or the one or more autonomous driving modules 1360 can cause the vehicle 1300 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The vehicle 1300 can include one or more modules, at least some of which are described herein. The modules can be implemented as computer-readable program code that, when executed by the one or more processors 1310, implement one or more of the various processes described herein. One or more of the modules can be a component of the one or more processors 1310. Alternatively or additionally, one or more of the modules can be executed on and/or distributed among other processing systems to which the one or more processors 1310 can be operatively connected. The modules can include instructions (e.g., program logic) executable by the one or more processors 1310. Alternatively or additionally, the one or more data store 1315 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 1300 can include one or more autonomous driving modules 1360. The one or more autonomous driving modules 1360 can be configured to receive data from the sensor system 1320 and/or any other type of system capable of capturing information relating to the vehicle 1300 and/or the external environment of the vehicle 1300. In one or more arrangements, the one or more autonomous driving modules 1360 can use such data to generate one or more driving scene models. The one or more autonomous driving modules 760 can determine position and velocity of the vehicle 1300. The one or more autonomous driving modules 1360 can determine the location of obstacles, obstacles, or other environmental features including traffic signs, trees, shrubs, neighboring vehicles, pedestrians, etc.

The one or more autonomous driving modules 1360 can be configured to receive and/or determine location information for obstacles within the external environment of the vehicle 1300 for use by the one or more processors 1310 and/or one or more of the modules described herein to estimate position and orientation of the vehicle 1300, vehicle position in global coordinates based on signals from a plurality of satellites, or any other data and/or signals that could be used to determine the current state of the vehicle 1300 or determine the position of the vehicle 1300 with respect to its environment for use in either creating a map or determining the position of the vehicle 1300 in respect to map data.

The one or more autonomous driving modules 1360 can be configured to determine one or more travel paths, current autonomous driving maneuvers for the vehicle 1300, future autonomous driving maneuvers and/or modifications to current autonomous driving maneuvers based on data acquired by the sensor system 1320, driving scene models, and/or data from any other suitable source such as determinations from the sensor data 1319. As used herein, "driving maneuver" can refer to one or more actions that affect the movement of a vehicle. Examples of driving maneuvers include: accelerating, decelerating, braking, turning, moving in a lateral direction of the vehicle 1300, changing travel lanes, merging into a travel lane, and/or reversing, just to name a few possibilities. The one or more autonomous driving modules 1360 can be configured to implement determined driving maneuvers. The one or more autonomous driving modules 1360 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The one or more autonomous driving modules 1360 can be configured to execute various vehicle functions and/or to transmit data to, receive data from, interact with, and/or control the vehicle 1300 or one or more systems thereof (e.g., one or more of vehicle systems 1340). For example, functions and/or operations of an automotive navigation system can be realized by the one or more autonomous driving modules 1360.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 4, 12, and 13, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for distinguishing, in a point cloud data set represented by an image, a first object from a second object, the system comprising:
    one or more processors;
    a data store communicably coupled to the one or more processors and storing the point cloud data set; and
    a memory communicably coupled to the one or more processors and storing:
        a functions module including instructions that when executed by the one or more processors cause the one or more processors to calculate results of a set of functions, wherein current positions of points in the point cloud data set are arguments for the functions and the set of functions includes attraction functions for the points and repulsion functions for the points;
        a reposition module including instructions that when executed by the one or more processors cause the one or more processors to cause, based on the results, at least some of the points to move from the current positions to new positions;
        an assessment module including instructions that when executed by the one or more processors cause the one or more processors to determine, based on the at least some of the points being at the new positions, an existence of a condition;
        a continuation module including instructions that when executed by the one or more processors cause the one or more processors to repeat, in response to a lack of the existence of the condition and with the current positions for the at least some of the points being replaced by the new positions, the instructions of the functions module, the instructions of the reposition module, and the instructions of the assessment module; and
        a distinguisher module including instructions that when executed by the one or more processors cause the one or more processors to distinguish, in response to the existence of the condition and in the point cloud data set represented by the image with the at least some of the points being at the new positions, the first object from the second object.

2. The system of claim 1, wherein the memory further stores a communications module that when executed by the one or more processors cause the one or more processors to receive, from a lidar system, the point cloud data set.

3. The system of claim 1, wherein the instructions of the functions module when executed by the one or more processors cause the one or more processors to calculate, for a point, the results of the set of functions, the set of functions being calculated with respect to a set of points that includes the point.

4. The system of claim 3, wherein the set of points includes all of the points in the point cloud data set.

5. The system of claim 3, wherein the set of points includes the points in the point cloud data set that are within a threshold distance of the point.

6. The system of claim 1, wherein original data for the points in the point cloud data set represent a first feature and a second feature.

7. The system of claim 6, wherein:
the first feature is original positions of the points in the image, and
the second feature is one of colors of the points, intensities of the points, or information that identifies objects associated with the points.

8. The system of claim 7, wherein the original data for the points in the point cloud data set further represent at least a third feature.

9. The system of claim 8, wherein:
the at least the third feature is the one of the colors of the points, the intensities of the points, or the information that identifies the objects associated with the points, and
the at least the third feature is different from the second feature.

10. The system of claim 6, wherein the instructions of the functions module when executed by the one or more processors cause the one or more processors to calculate the results of the set of functions by producing a factor graph for the point cloud data set, wherein:
vertices in the factor graph correspond to the points in the point cloud data set,
a first edge between a first vertex and a second vertex corresponds to a measure of a first difference, the first difference being between a value of the first feature for the first vertex and a value of the first feature for the second vertex, and
a second edge between the first vertex and the second vertex corresponds to a measure of a second difference, the second difference being between a value of the second feature for the first vertex and a value of the second feature for the second vertex.

11. The system of claim 10, wherein the instructions of the functions module when executed by the one or more processors further cause the one or more processors to calculate the results of the set of functions by:
associating a first probability with the first edge, and
associating a second probability with the second edge.

12. The system of claim 11, wherein the instructions of the assessments module when executed by the one or more processors cause the one or more processors to determine the existence of the condition in a manner that accounts for the first probability and the second probability.

13. The system of claim 1, wherein the condition comprises a loss function being at a minimum value.

14. The system of claim 13, wherein the loss function is equal to a sum of results of the attraction functions for the points added to a sum of results of the repulsion functions for the points.

15. The system of claim 1, wherein the instructions of the distinguisher module when executed by the one or more processors cause the one or more processors to cluster the points in the point cloud data set with the at least some of the points being at the new positions.

16. The system of claim 1, wherein the memory further stores a locator module that when executed by the one or more processors cause the one or more processors to determine, in response to a determination of a distinction between the first object and the second object and in the point cloud data set represented by the image with the points being at original positions, locations of the first object and the second object.

17. The system of claim 16, wherein the instructions of the locator module when executed by the one or more processors cause the one or more processors to segment the image associated with the point cloud data set with the points being at the original positions.

18. A method for distinguishing, in a point cloud data set represented by an image, a first object from a second object, the method comprising:
calculating, by a processor, results of a set of functions, wherein current positions of points in the point cloud data set are arguments for the functions and the set of functions includes attraction functions for the points and repulsion functions for the points;
causing, by the processor and based on the results, at least some of the points to move from the current positions to new positions;
determining, by the processor and based on the at least some of the points being at the new positions, an existence of a condition;
repeating, by the processor, in response to a lack of the existence of the condition, and with the current positions for the at least some of the points being replaced by the new positions, the calculating, the causing, and the determining; and
distinguishing, by the processor, in response to the existence of the condition, and in the point cloud data set represented by the image with the at least some of the points being at the new positions, the first object from the second object.

19. The method of claim 18, wherein:
original data for the points in the point cloud data set represent a first feature and a second feature,
the calculating the results of the set of functions includes producing a factor graph for the point cloud data set,
vertices in the factor graph correspond to the points in the point cloud data set,
a first edge between a first vertex and a second vertex corresponds to a measure of a first difference, the first difference being between a value of the first feature for the first vertex and a value of the first feature for the second vertex, and
a second edge between the first vertex and the second vertex corresponds to a measure of a second difference, the second difference being between a value of the second feature for the first vertex and a value of the second feature for the second vertex.

20. A non-transitory computer-readable medium for distinguishing, in a point cloud data set represented by an image, a first object from a second object, the non-transitory computer-readable medium including instructions that when executed by one or more processors cause the one or more processors to:
calculate results of a set of functions, wherein current positions of points in the point cloud data set are arguments for the functions and the set of functions includes attraction functions for the points and repulsion functions for the points;
cause, based on the results, at least some of the points to move from the current positions to new positions;
determine, based on the at least some of the points being at the new positions, an existence of a condition;
repeat, in response to a lack of the existence of the condition and with the current positions for the at least some of the points being replaced by the new positions, the instructions that cause the one or more processors to calculate the results, the instructions that cause the one or more processors to cause the at least some of the points to move, and the instructions that cause the one or more processors to determine the existence of the condition; and distinguish, in response to the existence of the condition and in the point cloud data set represented by the image with the at least some of the points being at the new positions, the first object from the second object.

\* \* \* \* \*